US012706668B2

(12) United States Patent
Takahashi et al.

(10) Patent No.: US 12,706,668 B2
(45) Date of Patent: Aug. 11, 2026

(54) OPTICAL TRANSCEIVER CONTROL METHOD AND OPTICAL TRANSCEIVER

(71) Applicant: 1FINITY Inc., Kawasaki (JP)

(72) Inventors: Toru Takahashi, Kawasaki (JP); Naoya Okada, Yokohama (JP); Yoshitaka Nomura, Shinagawa (JP)

(73) Assignee: 1FINITY Inc., Kawasaki (JP)

( * ) Notice: Subject to any disclaimer, the term of this patent is extended or adjusted under 35 U.S.C. 154(b) by 266 days.

(21) Appl. No.: 18/671,922

(22) Filed: May 22, 2024

(65) Prior Publication Data

US 2024/0396630 A1 Nov. 28, 2024

(30) Foreign Application Priority Data

May 26, 2023 (JP) ................................ 2023-087324
Apr. 26, 2024 (JP) ................................ 2024-073256

(51) Int. Cl.
*H04B 10/077* (2013.01)
*H04B 10/43* (2013.01)

(52) U.S. Cl.
CPC ......... *H04B 10/0775* (2013.01); *H04B 10/43* (2013.01)

(58) Field of Classification Search
CPC ........................... H04B 10/0775; H04B 10/43
See application file for complete search history.

(56) References Cited

U.S. PATENT DOCUMENTS

| | | | | |
|---|---|---|---|---|
| 9,679,178 | B2 * | 6/2017 | Wilz, Sr. | G06K 7/1465 |
| 9,935,720 | B2 * | 4/2018 | Fludger | H04B 10/6164 |
| 10,142,712 | B2 * | 11/2018 | Garcia | H04Q 11/0005 |
| 10,686,525 | B2 | 6/2020 | Jing et al. | |
| 11,070,296 | B1 * | 7/2021 | Guzzon | H03F 1/3241 |
| 2004/0202469 | A1 | 10/2004 | Kawaguchi et al. | |
| 2018/0241473 | A1 | 8/2018 | Jing et al. | |
| 2025/0141544 | A1 * | 5/2025 | Nakamura | H04B 10/079 |

FOREIGN PATENT DOCUMENTS

JP 2011-172147 9/2011

OTHER PUBLICATIONS

Oif, "Implementation Agreement for Integrated Coherent Transmit-Receive Optical Sub Assembly", OIF-IC-TROSA-01.0, Aug. 20, 2019.

* cited by examiner

*Primary Examiner* — Kenneth N Vanderpuye
*Assistant Examiner* — Asif Shameem
(74) *Attorney, Agent, or Firm* — Fujitsu Intellectual Property Center

(57) ABSTRACT

A control method of an optical transceiver having a transmission port, a reception port, and a light source for transmission and reception of an optical signal, includes: determining whether a state of a connection of a transmission path to the reception port is a loopback connection from the transmission port; and switching a control of a gain of the reception from an automatic gain control (AGC) to a fixed gain when determining the state of the connection to be the loopback connection.

13 Claims, 29 Drawing Sheets

FIG. 2A

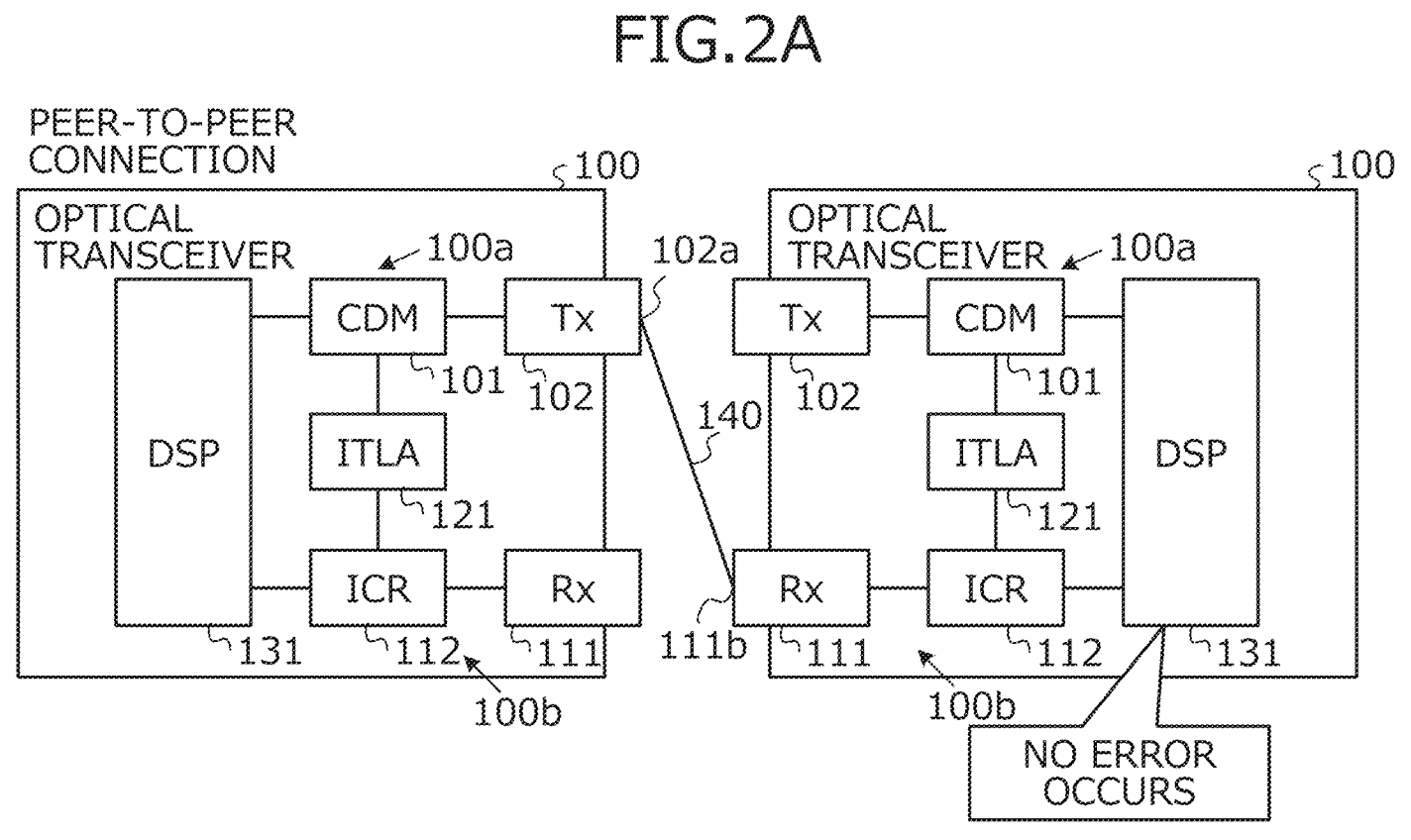

PEER-TO-PEER CONNECTION

OPTICAL TRANSCEIVER

100

100a

100b

DSP 131

CDM 101

ITLA 121

ICR 112

Tx 102

Rx 111

102a

140

111b

NO ERROR OCCURS

IN CASE OF FREQUENCY OFFSET

FIG.3B2
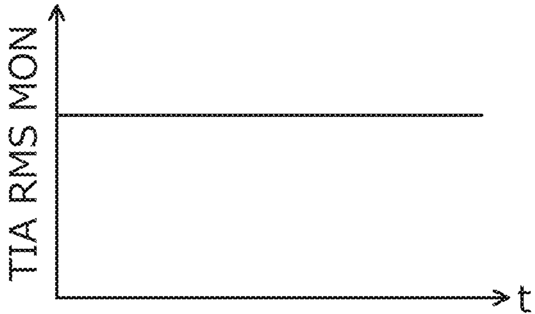
LOW-BAND COMPONENT OF INTER-SYMBOL TRANSITION SHIFTS OUTSIDE RMS MON BAND DUE TO FREQUENCY OFFSET AND IS THEREBY SMOOTHED AND VALUE OF RMS MON APPEARS CONSTANT
FIG.3B3
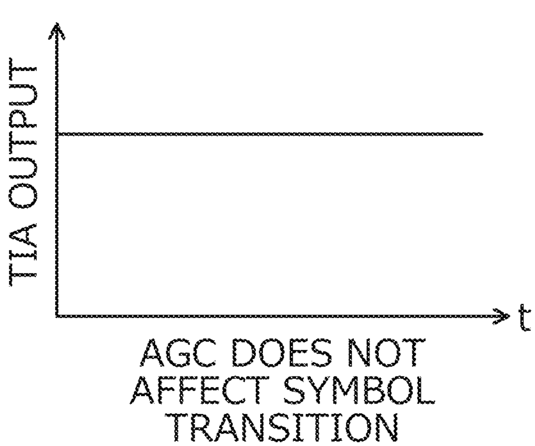
AGC DOES NOT AFFECT SYMBOL TRANSITION FIG.3C1
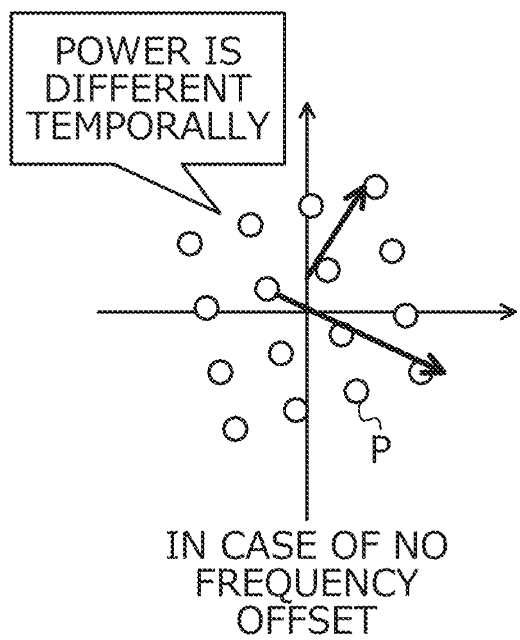
FIG.3C2
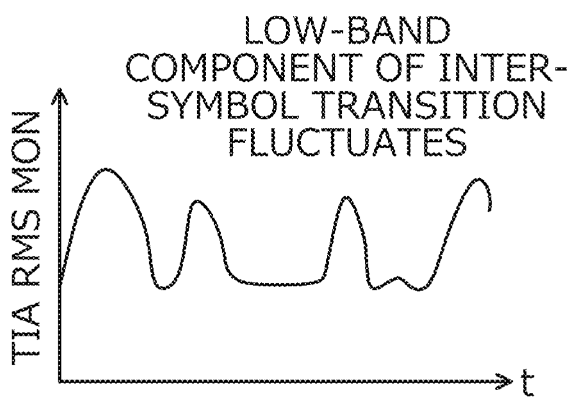

FIG.3C3
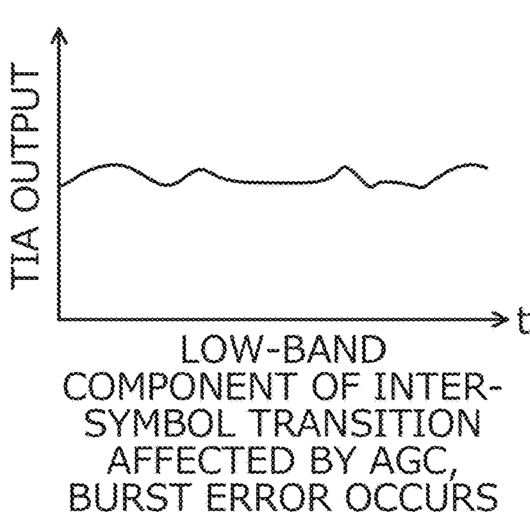
FIG.4
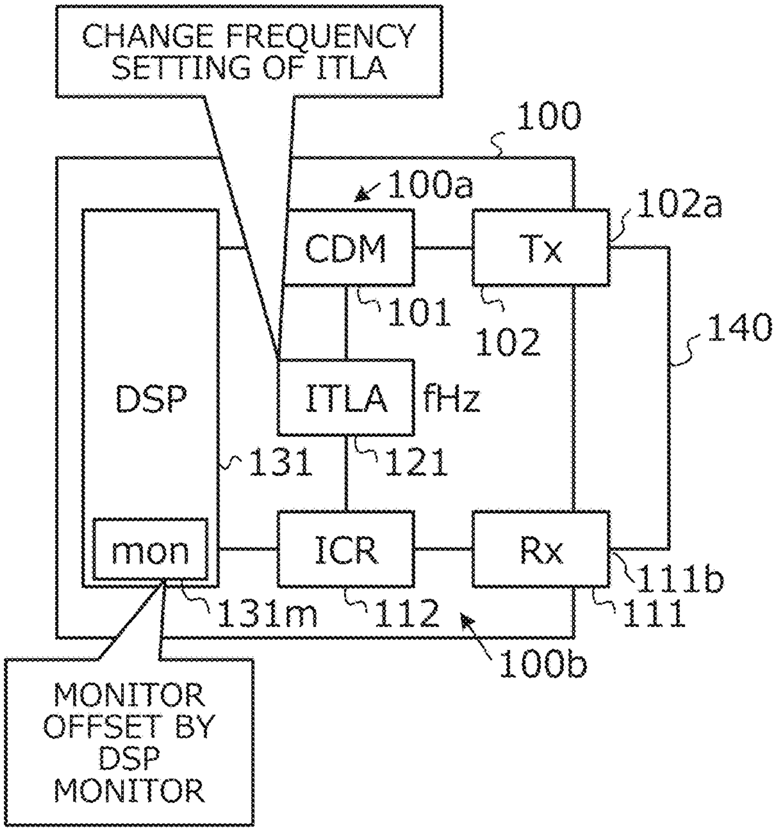

FIG.6A

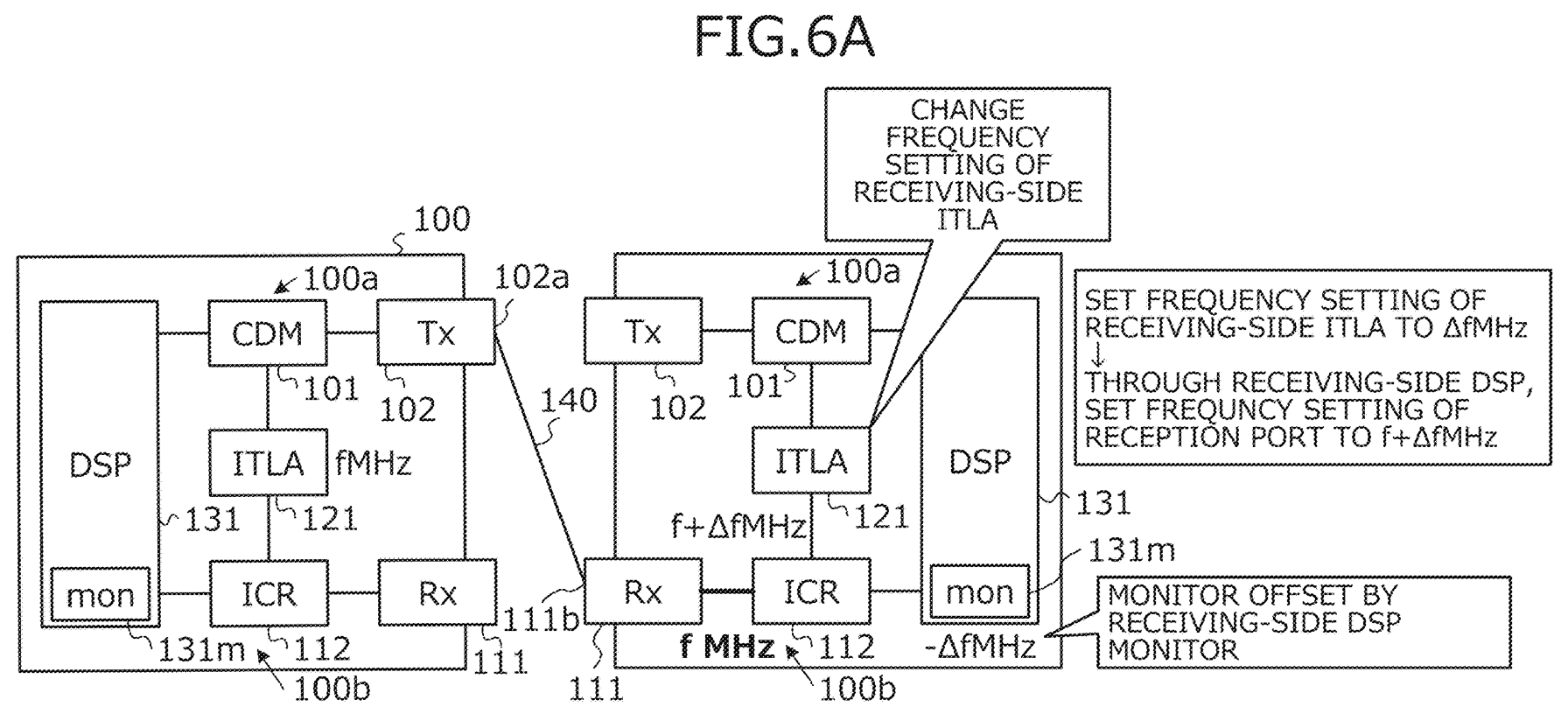

CHANGE FREQUENCY SETTING OF RECEIVING-SIDE ITLA

SET FREQUENCY SETTING OF RECEIVING-SIDE ITLA TO ΔfMHz
↓
THROUGH RECEIVING-SIDE DSP, SET FREQUNCY SETTING OF RECEPTION PORT TO f+ΔfMHz

MONITOR OFFSET BY RECEIVING-SIDE DSP MONITOR 100
100a
100b
Tx
102
CDM
101
ITLA
121
fMHz
ICR
112
Rx
111
DSP
131
mon
131m
102a
140
111b
f+ΔfMHz
f MHz
-ΔfMHz

Figure 6B:
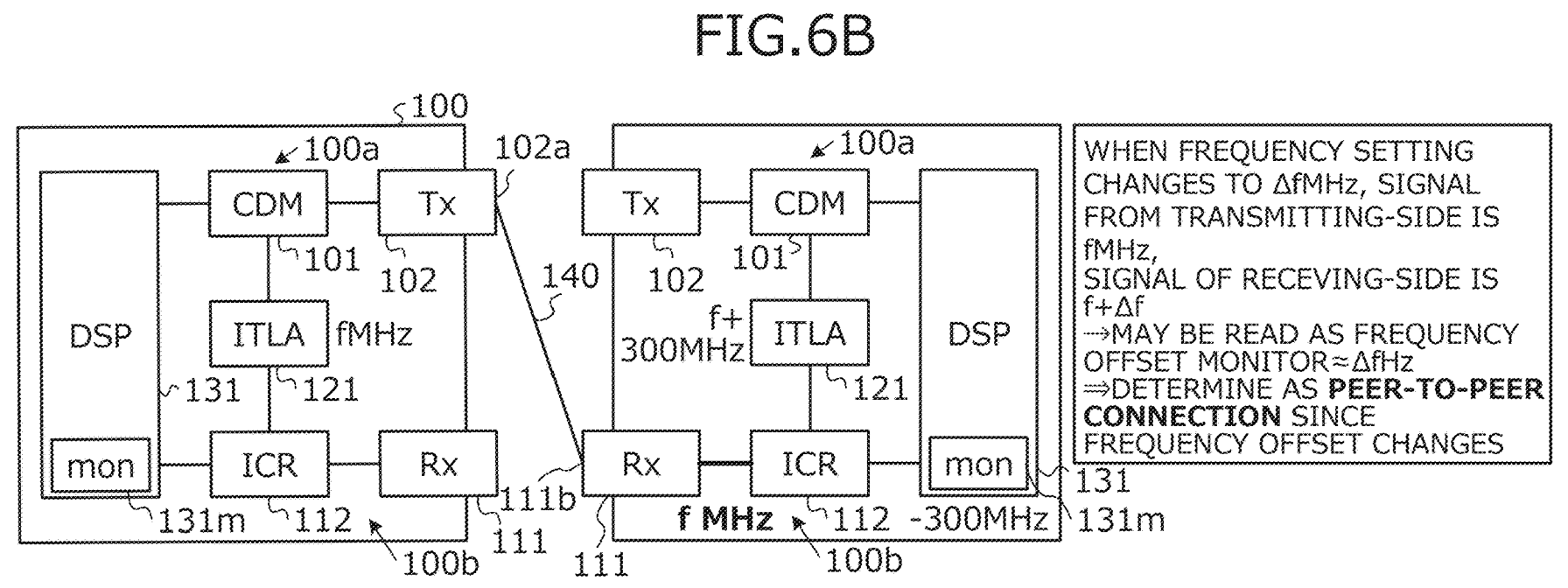

FIG.6B 100
100a
DSP
mon
131
131m
CDM
101
ITLA
fMHz
121
ICR
112
Tx
102
102a
Rx
111
111b
100b
140

100a
Tx
102
CDM
101
f+
300MHz
ITLA
121
Rx
111
f MHz
ICR
112
-300MHz
100b
DSP
mon
131
131m WHEN FREQUENCY SETTING CHANGES TO ΔfMHz, SIGNAL FROM TRANSMITTING-SIDE IS fMHz,
SIGNAL OF RECEVING-SIDE IS f+Δf
→MAY BE READ AS FREQUENCY OFFSET MONITOR≈ΔfHz
⇒DETERMINE AS PEER-TO-PEER CONNECTION SINCE FREQUENCY OFFSET CHANGES 100
100a
TRANSMITTING-SIDE CONTROLLER
701
TRANSMITTING-SIDE DSP
131a
DAC
702
CDM
101
102a
RECEIVING-SIDE CONTROLLER
703
FREQUENCY SETTING UNIT
713
ITLA
121
140
LOOPBACK DETERMINING UNIT
712
GAIN MODE SETTING UNIT
714
FREQUENCY OFFSET READING UNIT
711
100b
RECEIVING-SIDE DSP
131b
ADC
304
TIA
303
PD
302
90°HYBRID CIRCUIT
301
111b 100
100a
TRANSMITTING-SIDE DSP
131a
DAC
702
CDM
101
102a
701
TRANSMITTING-SIDE CONTROLLER
ITLA
121
140
RECEIVING-SIDE CONTROLLER
LOOPBACK DETERMINING UNIT
712
GAIN MODE SETTING UNIT
714
ID READING UNIT
1301
703
100b
RECEIVING-SIDE DSP
131b
ADC
304
TIA
303
PD
302
90°HYBRID CIRCUIT
301
111b

FIG.14

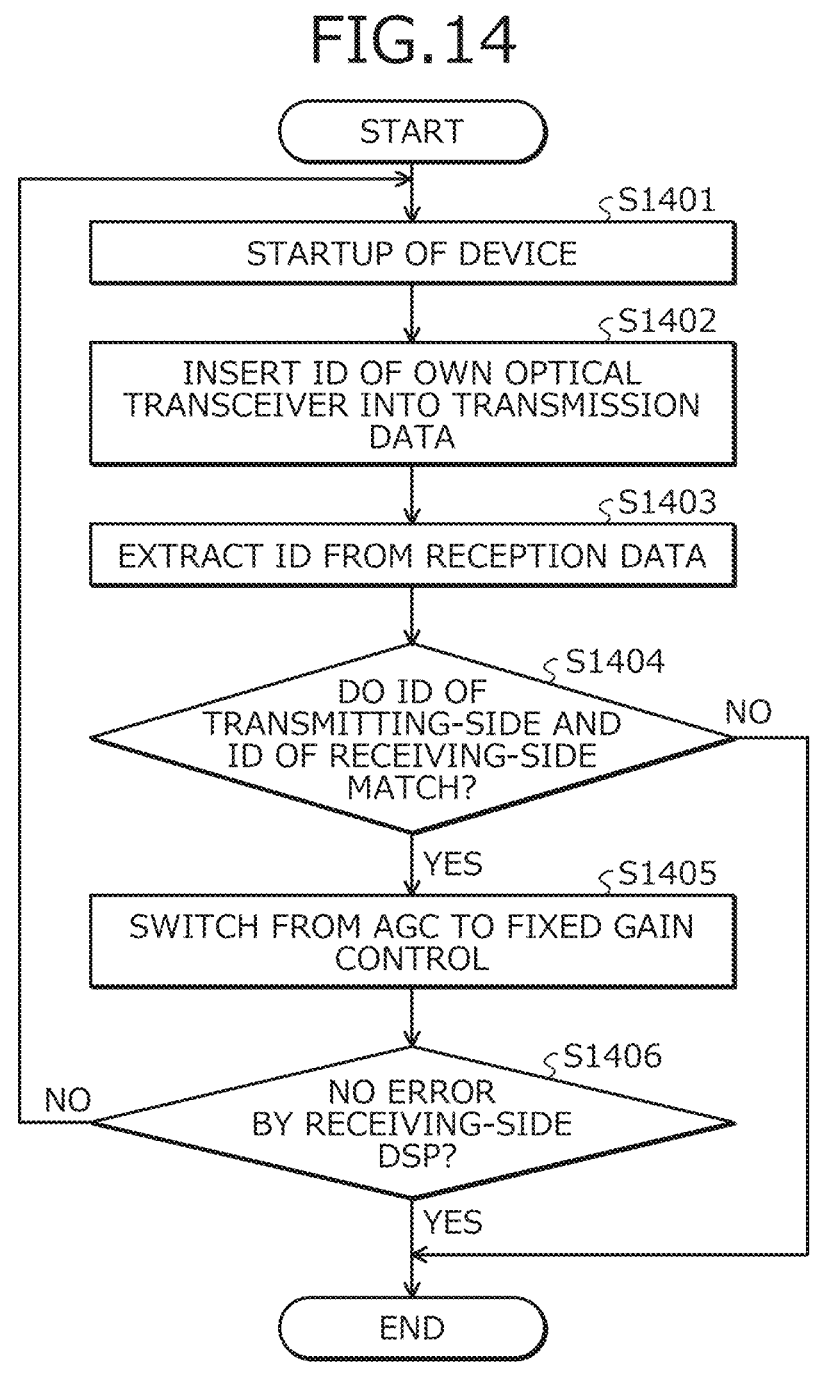

START
S1401
STARTUP OF DEVICE
S1402
INSERT ID OF OWN OPTICAL TRANSCEIVER INTO TRANSMISSION DATA
S1403
EXTRACT ID FROM RECEPTION DATA
S1404
DO ID OF TRANSMITTING-SIDE AND ID OF RECEIVING-SIDE MATCH?
NO
YES
S1405
SWITCH FROM AGC TO FIXED GAIN CONTROL
S1406
NO ERROR BY RECEIVING-SIDE DSP?
NO
YES
END 1500
1500a
ITLA
LD (TRANSMISSION LIGHT)
1502
FREQUENCY ADJUSTING UNIT
1501
TRANSMITTING -SIDE DSP
131a
DAC
702
DRIVER
1503
IQ MODULATING UNIT
1504
102a
140
RECEPTION LIGHT
1500b
FREQUENCY ADJUSTING UNIT
1511
LD (LOCAL LIGHT)
1512
111b
90°HYBRID CIRCUIT
301
PD
302
TIA
303
ADC
304
RECEIVING-SIDE DSP
131b
RAM
1513
RECEIVING-SIDE CONTROLLER
LOOPBACK DETERMINING UNIT
1514
DETERMINATION RESULT
1525

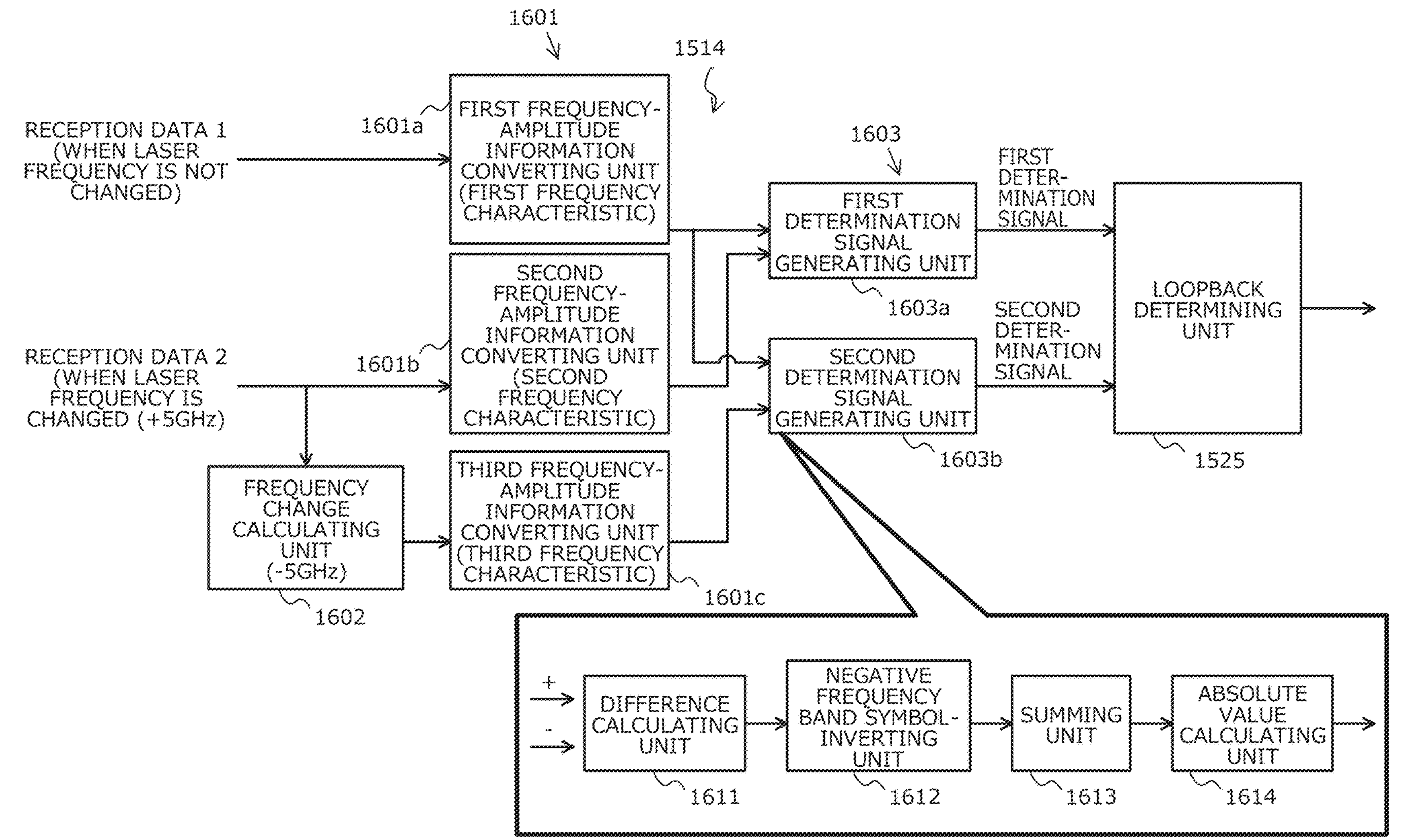
FIG.16
1601
1514
RECEPTION DATA 1 (WHEN LASER FREQUENCY IS NOT CHANGED)
1601a
FIRST FREQUENCY-AMPLITUDE INFORMATION CONVERTING UNIT (FIRST FREQUENCY CHARACTERISTIC)
1603
FIRST DETERMINATION SIGNAL GENERATING UNIT
1603a
FIRST DETER-MINATION SIGNAL
LOOPBACK DETERMINING UNIT
1525
RECEPTION DATA 2 (WHEN LASER FREQUENCY IS CHANGED (+5GHz)
1601b
SECOND FREQUENCY-AMPLITUDE INFORMATION CONVERTING UNIT (SECOND FREQUENCY CHARACTERISTIC)
SECOND DETERMINATION SIGNAL GENERATING UNIT
1603b
SECOND DETER-MINATION SIGNAL
FREQUENCY CHANGE CALCULATING UNIT (-5GHz)
1602
THIRD FREQUENCY-AMPLITUDE INFORMATION CONVERTING UNIT (THIRD FREQUENCY CHARACTERISTIC)
1601c
+
-
DIFFERENCE CALCULATING UNIT
1611
NEGATIVE FREQUENCY BAND SYMBOL-INVERTING UNIT
1612
SUMMING UNIT
1613
ABSOLUTE VALUE CALCULATING UNIT
1614

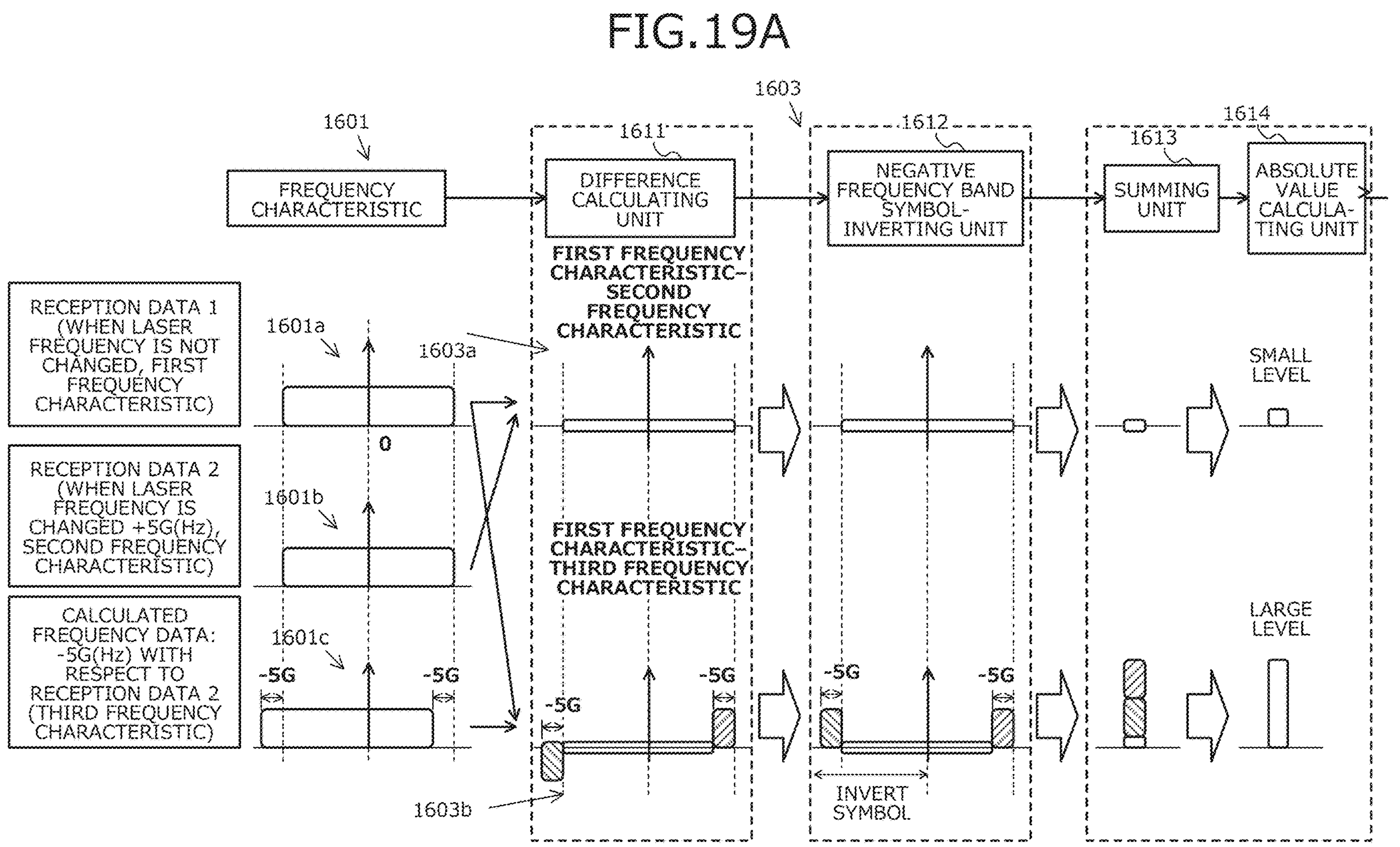
FIG.19A
1601
FREQUENCY CHARACTERISTIC
1603
1611
DIFFERENCE CALCULATING UNIT
1612
NEGATIVE FREQUENCY BAND SYMBOL-INVERTING UNIT
1613
SUMMING UNIT
1614
ABSOLUTE VALUE CALCULA-TING UNIT
RECEPTION DATA 1 (WHEN LASER FREQUENCY IS NOT CHANGED, FIRST FREQUENCY CHARACTERISTIC)
1601a
1603a
FIRST FREQUENCY CHARACTERISTIC–SECOND FREQUENCY CHARACTERISTIC
SMALL LEVEL
0
RECEPTION DATA 2 (WHEN LASER FREQUENCY IS CHANGED +5G(Hz), SECOND FREQUENCY CHARACTERISTIC)
1601b
FIRST FREQUENCY CHARACTERISTIC–THIRD FREQUENCY CHARACTERISTIC
LARGE LEVEL
CALCULATED FREQUENCY DATA: -5G(Hz) WITH RESPECT TO RECEPTION DATA 2 (THIRD FREQUENCY CHARACTERISTIC)
1601c
-5G
1603b
INVERT SYMBOL

FIG.20

| | FIRST DETERMINATION SIGNAL | SECOND DETERMINATION SIGNAL |
|---|---|---|
| LOOPBACK CONNECTION | SMALL | LARGE |
| NOT LOOPBACK CONNECTION | LARGE | SMALL |

Figure 22:
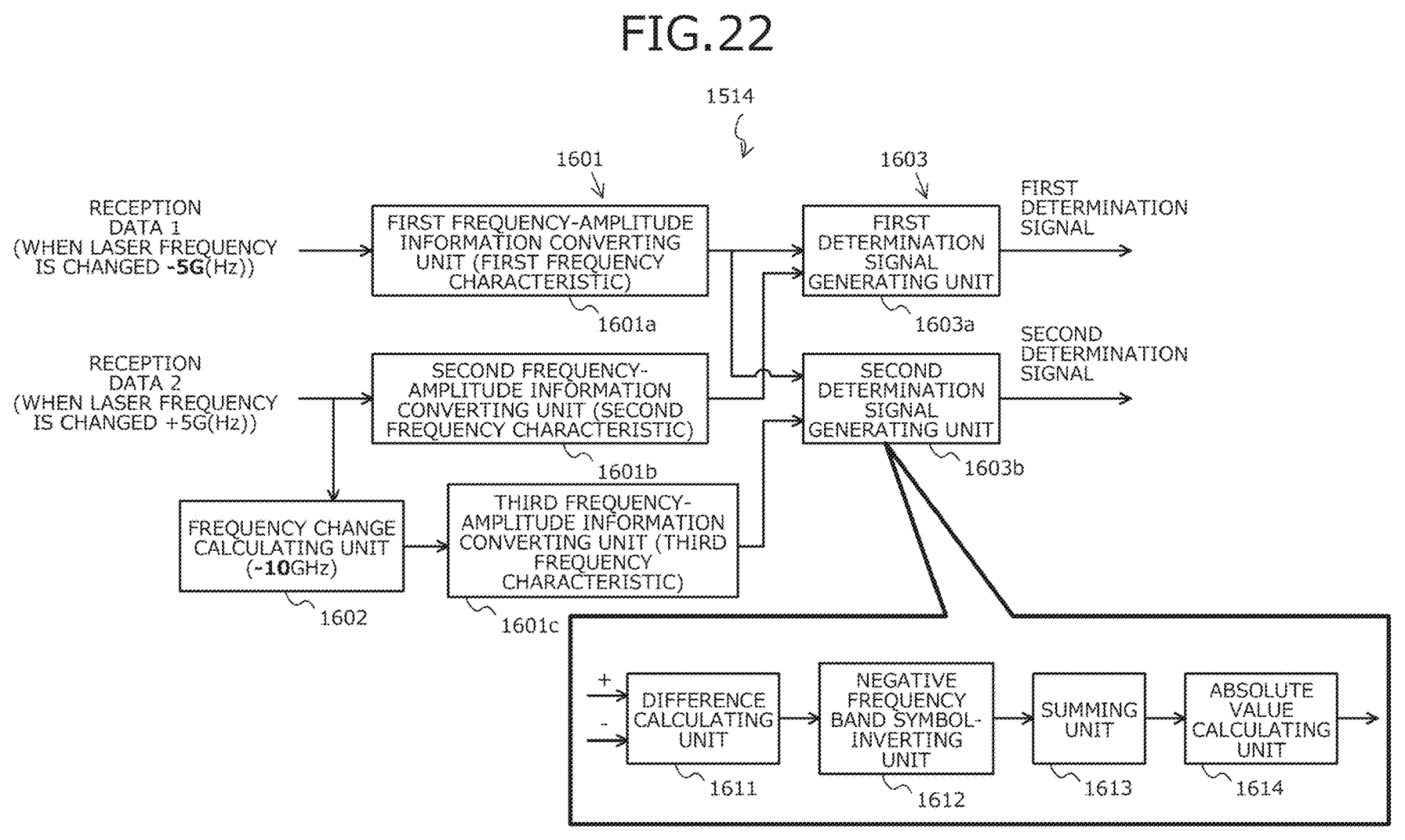

RECEPTION DATA 1 (WHEN LASER FREQUENCY IS CHANGED -5G(Hz))

RECEPTION DATA 2 (WHEN LASER FREQUENCY IS CHANGED +5G(Hz))

FIRST FREQUENCY-AMPLITUDE INFORMATION CONVERTING UNIT (FIRST FREQUENCY CHARACTERISTIC)

1601a

SECOND FREQUENCY-AMPLITUDE INFORMATION CONVERTING UNIT (SECOND FREQUENCY CHARACTERISTIC)

1601b

FREQUENCY CHANGE CALCULATING UNIT (-10GHz)

1602

THIRD FREQUENCY-AMPLITUDE INFORMATION CONVERTING UNIT (THIRD FREQUENCY CHARACTERISTIC)

1601c

1603

FIRST DETERMINATION SIGNAL GENERATING UNIT

1603a

SECOND DETERMINATION SIGNAL GENERATING UNIT

1603b

FIRST DETERMINATION SIGNAL

SECOND DETERMINATION SIGNAL

+

-

DIFFERENCE CALCULATING UNIT

1611

NEGATIVE FREQUENCY BAND SYMBOL-INVERTING UNIT

1612

SUMMING UNIT

1613

ABSOLUTE VALUE CALCULATING UNIT

1614

OPTICAL TRANSCEIVER CONTROL METHOD AND OPTICAL TRANSCEIVER

CROSS REFERENCE TO RELATED APPLICATIONS

This application is based upon and claims the benefit of priority of the prior Japanese Patent Application No. 2023-087324, filed on May 26, 2023 and the prior Japanese Patent Application No. 2024-073256, filed on Apr. 26, 2024, the entire contents of which are incorporated herein by reference.

FIELD OF THE INVENTION

Embodiments discussed herein are related to an optical transceiver control method and an optical transceiver.

BACKGROUND OF THE INVENTION

An optical transceiver includes, for example, an optical transmitter (coherent driver modulator (CDM)) and an optical receiver (intradyne coherent receiver (ICR)). Conventionally, the optical transmitter and the optical receiver, respectively, had separate light sources for emitting local light for digital coherent optical transmission.

However, when the optical transmitter and the optical receiver both use light from a single (common) light source such as, for example, an integrable tunable laser assembly (ITLA), the number of light sources decreases, enabling reductions in the size and power consumption of the optical transceiver. Further, at the optical receiver, a gain control such as an automatic gain control (AGC) is applied to received optical signals.

Further, in an operation verification test or the like at the time of delivery of a product, evaluation may be performed using a single device as both the device on the transmitting-side and the device on the receiving-side. In this instance, a transmission port and a reception port of a single optical transceiver are connected to each other by an optical fiber.

As for a prior art related to adjusting gain, for example, an existing optical transceiver compares the level of an optical signal or the level of an RF signal with a threshold and according to a result of the comparison, switches between AGC and no AGC. Further, an existing cascade hybrid amplifier calculates gain deviation according to input optical power when no reflection alarm is present during Raman excitation of the hybrid amplifier, adjusts Raman gain according to the gain deviation, and switches to an AGC operation mode after adjusting the Raman gain. Further, an existing technology switches an optical amplifier to an AGC when the number of wavelengths input to an optical wavelength division multiplexing transmission device varies, and after adjusting the power levels of optical signals of the wavelengths, the technology again switches the optical amplifier to an automatic level control (ALC). For examples, refer to Japanese Laid-Open Patent Publication No. 2011-172147; U.S. Pat. No. 10,686,525; U.S. Patent Application, Publication No. 2004/0202469.

SUMMARY OF THE INVENTION

According to an aspect of an embodiment, a control method of an optical transceiver having a single light source for transmission and reception of an optical signal, includes: determining whether a state of a connection of a transmission path to a reception port is a loopback connection from a transmission port of the optical transceiver of the reception port; and switching a control of a gain of the reception from an automatic gain control (AGC) to a fixed gain when determining the state of the connection to be the loopback connection.

An object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2A is a diagram depicting a connection state of the optical transceiver.

FIG. 3B1 is an explanatory diagram for the instance in which an error occurs due to the frequency offset amount for transmission and reception being zero.

FIG. 3B2 is an explanatory diagram for the instance in which an error occurs due to the frequency offset amount for transmission and reception being zero.

FIG. 3B3 is an explanatory diagram for the instance in which an error occurs due to the frequency offset amount for transmission and reception being zero.

FIG. 3C1 is an explanatory diagram for the instance in which an error occurs due to the frequency offset amount for transmission and reception being zero.

FIG. 3C2 is an explanatory diagram for the instance in which an error occurs due to the frequency offset amount for transmission and reception being zero.

FIG. 3C3 is an explanatory diagram for the instance in which an error occurs due to the frequency offset amount for transmission and reception being zero.

FIG. 4 is an explanatory diagram of a first determination example of loopback.

FIG. 6A is an explanatory diagram of determination of a peer-to-peer connection by the first determination example.

FIG. 6B is an explanatory diagram of the determination of a peer-to-peer connection by the first determination example.

FIG. 14 is a flowchart depicting an example of processes of determining loopback by the second determination example.

FIG. 16 is a block diagram of the functions of a receiving-side controller.

FIG. 19A is a diagram depicting examples of data of each unit of a determination signal generating unit when the connection is a loopback connection.

FIG. 20 is a diagram depicting determination conditions for determining whether the connection is a loopback connection.

FIG. 22 is a block diagram depicting the functions of the receiving-side controller in the modification example of the second embodiment.

DESCRIPTION OF THE INVENTION

First, problems associated with the conventional techniques are discussed. In an instance in which the transmission port and the reception port of an optical transceiver that uses a single light source for the transmitting-side and the receiving-side are in a loopback connection state, when gain is controlled by an AGC, the frequency offset between the transmitting-side and the receiving-side is 0, signal components become distorted, and signal errors may occur. In this instance, for example, the operation verification test cannot be performed properly and, for example, it is impossible to discern whether the optical transceiver is malfunctioning or there is a problem with a different transmission path.

Embodiments of an optical transceiver of the present disclosure are described in detail with reference to the accompanying drawings.

Figure 1:
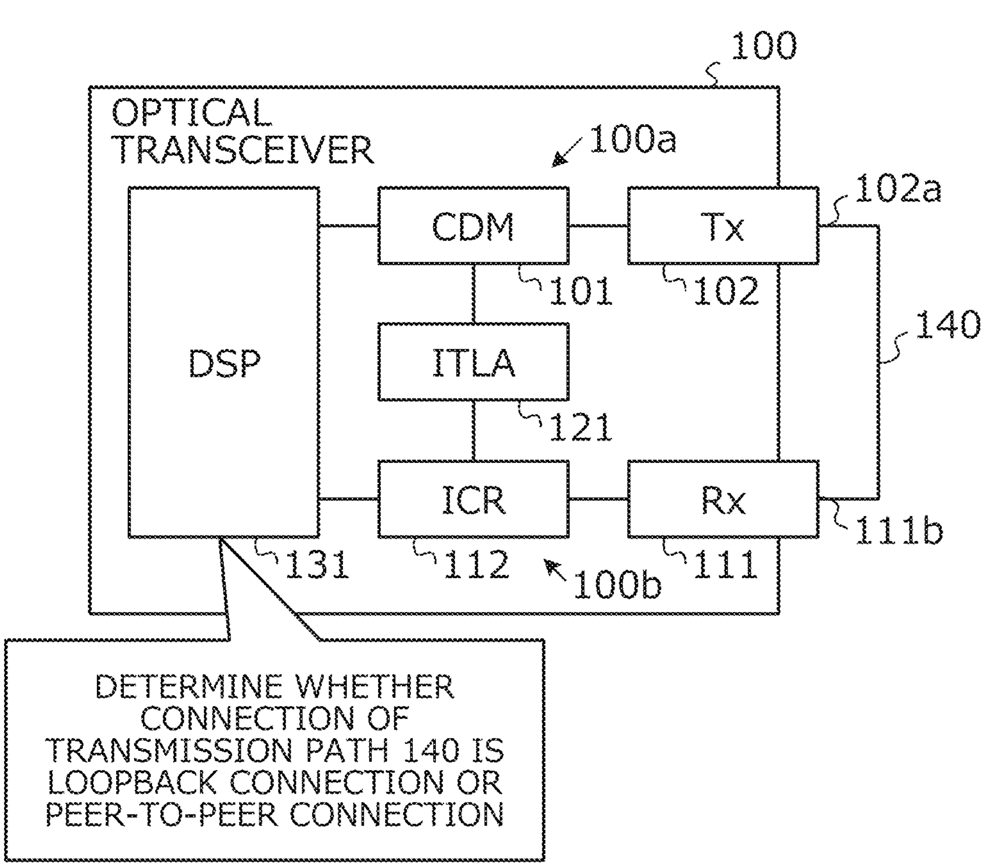
FIG. 1 is an explanatory diagram of an optical transceiver according to a first embodiment.

FIG. 1 is an explanatory diagram of an optical transceiver according to a first embodiment. An optical transceiver 100 is, for example, a digital coherent optical transceiver. The optical transceiver 100 includes a CDM 101 and a transmitting unit (Tx) 102 as an optical transmitter 100*a*. The optical transceiver 100 further includes a receiving unit (Rx) 111 and an ICR 112 as an optical receiver 100*b*.

For example, an ITLA 121 is used as a light source; the ITLA 121 outputs a common optical signal (locally generated light) to the CDM 101 of the optical transmitter 100*a* and to the ICR 112 of the optical receiver 100*b*. A digital signal processor (DSP) 131 outputs transmission data to the CDM 101 of the optical transmitter 100*a*, receives input of reception data from the ICR 112 of the optical transmitter 100*a*, and performs signal processing for the transmitting-side and the receiving-side. While described hereinafter, the DSP 131 includes a transmitting-side DSP that performs a transmission data process of the optical transmitter 100*a* and a receiving-side DSP that performs a reception data process of the optical receiver 100*b*.

In the singular optical transceiver 100, use of a single light source (the ITLA 121) for the optical transmitter 100*a* and the optical receiver 100*b* has become an industry standard (for example, refer to Implementation Agreement for Integrated Coherent Transmit-Receive Optical Sub Assembly, OIF-IC-TROSA-01.0, Aug. 20, 2019, p. 13, etc.)

The transmitting unit 102 and transmits and outputs optical signals from the transmission port 102*a*. The receiving unit 111 receives optical signals input to the reception port 111*b*.

The optical transceiver 100 of the first embodiment has a function of determining whether a cabled connection to the reception port 111*b* is a loopback connection. In an instance of a loopback connection, the optical transceiver 100 switches a gain control from an AGC to a fixed gain control (manual gain control (MGC)).

A loopback connection, as depicted in FIG. 1, is a state in which the transmission port 102*a* and the reception port 111*b* of the single optical transceiver 100 are connected to each other by a transmission path (optical fiber) 140. In contrast, a state in which a first end of the transmission path is connected to the transmission port 102*a* of the optical transmitter 100*a* of a first optical transceiver 100 while a second end of the transmission path is connected to the reception port 111*b* of the optical receiver 100*b* of a second optical transceiver 100 is called a "peer-to-peer connection" connection. In the actual operation of optical transmission, the optical transceiver 100 employs peer-to-peer connection.

The optical transceiver 100 of the first embodiment determines whether the connection is a loopback connection, based on variation of a frequency offset amount between an optical signal and locally generated light, with respect to variation of the frequency of a light source. For example, determination is made by a first and second determination example below. The optical transceiver 100 determines that a connection other than a loopback connection is a peer-to-peer connection.

The first determination example is described. In an instance in which the frequency of locally generated light of the ITLA 121 is varied by a predetermined offset amount and the offset amount and a frequency detected by the optical receiver 100*b* are not different (are the same), the fiber connection is determined to be a loopback connection. The optical transceiver 100 may notify an operator, etc. by outputting the determination result of the loopback connection.

The second determination example is described. An ID (identification information) unique to the optical transceiver 100 or the optical transmitter 100*a* is embedded in an available region of a pilot symbol of an optical signal to be transmitted. Subsequently, it is determined whether an ID received by the optical receiver 100*b* matches an ID of the device thereof (the optical transceiver 100) and when the IDs match, the fiber connection is determined to be a loopback connection.

As described, according to the first embodiment, even with an optical transceiver that uses a single light source between the optical transmitter and the optical receiver, the optical transceiver itself may determine whether the state of the port connection is a loopback connection. Further, when a loopback connection is detected, the gain control of the optical transceiver 100 is suitably switched according to the state of the loopback connection. For example, while the gain control is by an AGC during normal operation, when control by the AGC is performed under a state of loopback connection, as described, problems such as the occurrence of errors with received signals and the operation verification test not being performed properly arise, the gain control is switched to a fixed gain control, thereby enabling these problems to be circumvented.

Here, with reference to FIGS. 2A, 2B, 3A, 3B1, 3B2, 3B3, 3C1, 3C2, and 3C3, problems occurring with a loopback connection are discussed.

Figure 2B:
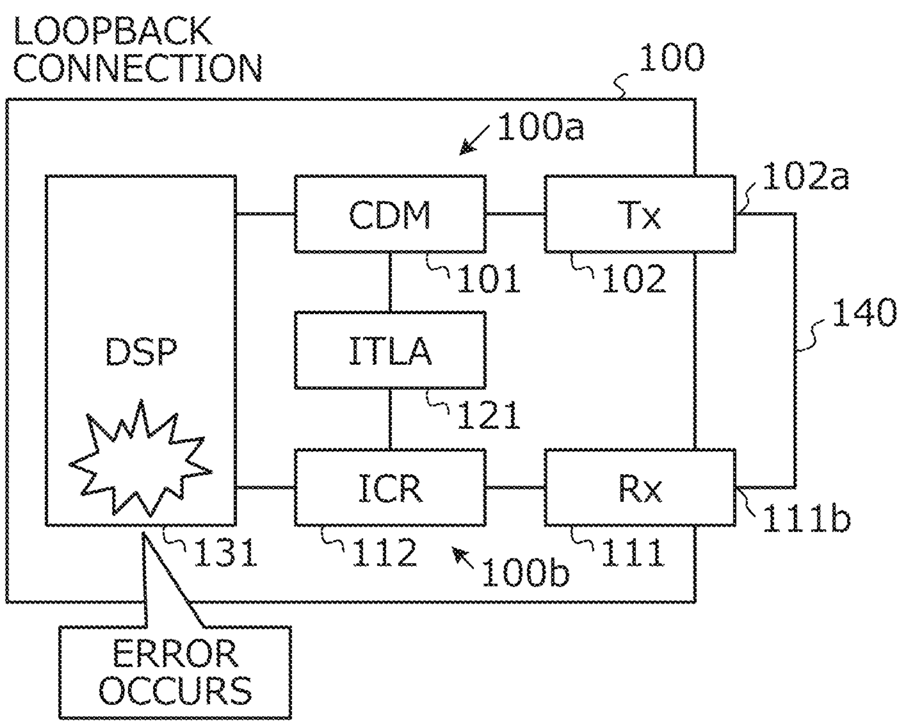
FIG. 2B is a diagram depicting a connection state of the optical transceiver.

FIGS. 2A and 2B are diagrams depicting connection states of the optical transceiver. FIG. 2A depicts a state in which two of the optical transceivers 100, 100 are connected by a peer-to-peer connection. With a "peer-to-peer connection," a first end of the transmission path 140 is connected to the transmission port 102*a* of the optical transmitter 100*a* of a first one of the optical transceivers 100 while a second end of the transmission path 140 is connected to the reception port 111*b* of the optical receiver 100*b* of a second one (communications counterpart) of the optical transceivers 100. During normal operation, the two optical transceivers 100, 100 are connected by a peer-to-peer connection and transmit and receive optical signals between each other. Under normal operation, there are no instances of use with a loopback connection (connection by which an optical signal is transmitted by and to a single device).

FIG. 2B depicts a single optical transceiver 100 in a loopback connection state. To confirm that startup is normal, the loopback connection, for example, is implemented when a problem such as a signal not being communicated occurs during an initial startup such as startup at the time of product shipping of the optical transceiver 100. In this confirmation, an operator performs a task of distinguishing between failure of the optical transceiver 100 and a problem elsewhere such as the transmission path 140. Here, the task of determining and distinguishing between a problem with the optical transceiver 100 itself and a problem on the transmission path 140 is extremely important. The task of distinguishing between device problems and transmission path problems cannot be performed when an error occurs in a state of loopback connection.

Here, as depicted in FIG. 2B, an instance is assumed in which connection of the single optical transceiver 100 having the ITLA 121 that is used for both transmitting and receiving is a loopback connection. In this instance, the frequency of an optical signal on the optical transmitter 100*a* (the CDM 101) side and the frequency of an optical signal on the optical receiver 100*b* (the ICR 112) side are the same (frequency offset is 0) and at the DSP 131, an error with a reception signal occurs.

With the configuration in which optical signals output by the ITLA 121 are used for both transmission and reception by the single optical transceiver 100, when the frequency offset enters the AGC band of the ICR 112, signal components are deformed, resulting in degradation of the signal. For example, in an instance of multilevel modulation like 64 quadrature amplitude modulation (QAM), a worst burst error occurs. An error occurs with loopback and thus, the operator cannot perform the task of distinguishing between device problems and transmission path problems and is unable to identify a cause of a malfunction and as a result, a suitable measure for the malfunction cannot be performed.

Figure 3A:
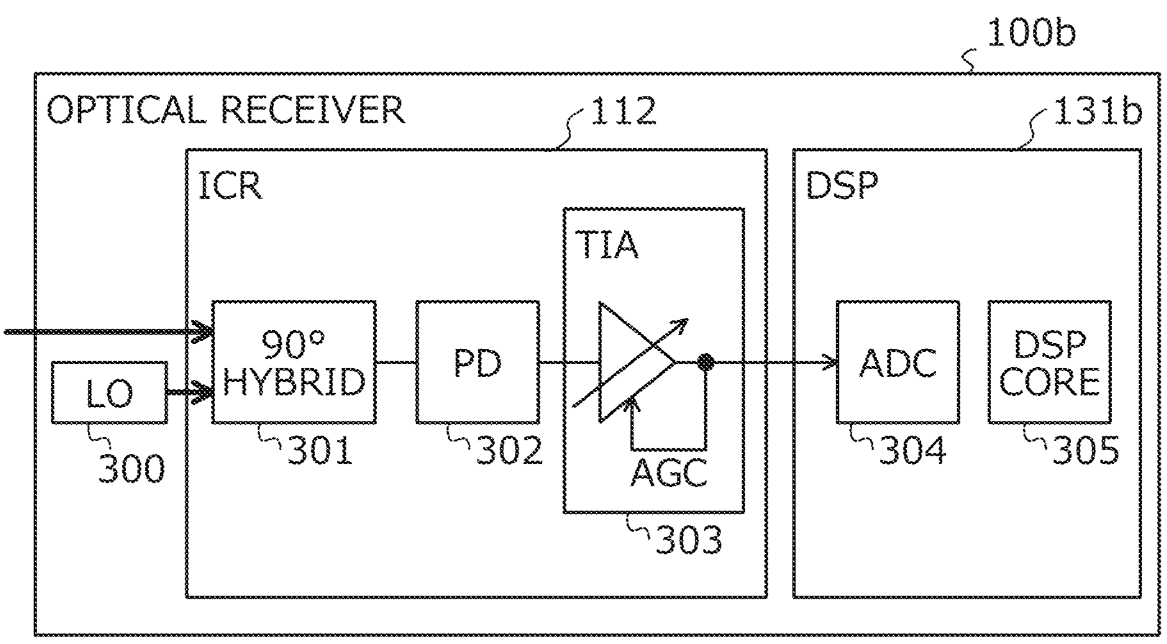
FIG. 3A is an explanatory diagram for an instance in which an error occurs due to a frequency offset amount for transmission and reception being zero.

FIGS. 3A, 3B1, 3B2, 3B3, 3C1, 3C2, and 3C3 are explanatory diagrams for an instance in which an error occurs due to the frequency offset amount for transmission and reception being zero. FIG. 3A schematically depicts the optical receiver 100*b* of the optical transceiver 100. A WDM optical signal from the transmission path 140 and locally generated light LO of the ITLA 121 are caused to interfere with each other by a 90-degree hybrid circuit 301 of the ICR 112 are opto-electrically converted by a photo detector (PD) 302.

In the ICR 112, optical power detected by the PD 302 is optically amplified by a TIA 303 and thereafter, is output to an ADC 304 of a receiving-side DSP 131*b*. The ADC 304 performs analog-to-digital conversion on the optical power, a DSP core 305 performs signal processing and outputs a resulting signal as reception data. The TIA 303 performs a gain control of the optical power by a loop control of an AGC.

FIGS. 3B1, 3B2, and 3B3 are explanatory diagrams of a case of frequency offset. In an instance of frequency offset between transmission and reception optical signals, when viewed by an IQ axis constellation depicted in FIG. 3B1, input to the receiving-side DSP 131*b* is smooth without temporal fluctuation of the amplitude at each signal point (symbol) P.

In FIG. 3B2, a horizontal axis is time, a vertical axis is RMS monitor level of the TIA 303, a low-band component of inter-symbol transition is also shifted outside the band of the RMS monitor by frequency offset and thereby, smoothed, whereby the value of the RMS monitor becomes constant.

In FIG. 3B3, a horizontal axis is time, a vertical axis is the output level of the TIA 303, and symbol transition is not affected and made constant by control under an AGC.

FIG. 3C1, 3C2, 3C3 are explanatory diagrams of a case of no frequency offset. When there is no frequency offset between the transmission and the reception of optical signals, on an IQ axis constellation in FIG. 3C1, the amplitude of the symbol temporally fluctuates and thus, a low-band component within the band varies, affecting signal components.

For example, including an instance in which the frequency offset amount is 0, when a value is in a region (for example, 10 MHz) of the AGC of the ICR 112, as depicted in FIG. 3C2, a low-band component of inter-symbol transition appears to fluctuate within the band of the RMS monitor.

In this instance, as depicted in FIG. 3C3, an output level of the TIA 303 is affected by the low-band component of the symbol transition, an error occurs, and signal degradation occurs. For example, in an instance of multilevel modulation such as 64QAM, a burst error occurs.

In a configuration in which the light source of the optical transmitter and the light source of the optical receiver are separate, even in a state of a loopback connection, the described frequency offset problems do not occur. However, like the optical transceiver 100 assumed in the first embodiment, in a configuration in which the optical transmitter 100*a* and the optical receiver 100*b* use a single light source (the ITLA 121), in a state of a loopback connection, the problem of errors occurring due to the frequency offset described above occurs. To solve this problem, in the first embodiment, as described above, it is determined whether connection of the transmission path (optical fiber) 140 having one end thereof connected to the reception port 111*b* is a loopback connection.

Regarding the described AGC, when the number of wavelengths of WDM suddenly changes in the transmission path 140, the level of the optical signal may suddenly change due to a problem of an optical amplifier, which amplifies WDM optical signals. Even in such an instance, the input level to the DSP 131 is adjusted by the AGC so that the optical signal is not buried in noise.

Here, under normal operation in which the optical transceiver 100 is connected to the transmission path 140 by a peer-to-peer connection, the input power of the optical signal at the receiving-side temporally fluctuates and thus, the AGC is necessary. In contrast, in a state of a loopback connection, the input power does not fluctuate. Thus, with the optical transceiver 100 of the first embodiment, in an instance in which a loopback connection is detected, for example, a fixed gain control (manual gain control (MGC)) is switched to from the AGC, whereby no problems occur in terms of control.

FIG. 4 is an explanatory diagram of the first determination example of loopback. In the first determination example, the frequency setting of locally generated light fMHz of the ITLA 121 is changed by the frequency offset amount. Here, in an instance in which the frequency offset amount detected by the optical receiver 100*b* does not change (is the same), the optical transceiver 100 determines that fiber connection is a loopback connection. The optical transceiver 100 executes the flowing processes.

1. Before changing the frequency of the ITLA 121, the optical transceiver 100 measures the frequency offset amount, using a monitor 131*m* of the DSP 131 on the receiving-side. 2. The optical transceiver 100 varies the frequency of the ITLA 121 and measures the frequency offset amount, using the monitor 131*m* of the DSP 131 on the receiving-side. 3. The optical transceiver 100 repeatedly performs the described processes of 1. and 2. 4. Based on a predetermined determination condition, the optical transceiver 100 determines whether the connection is a loopback connection. Details of the determination condition are described hereinafter.

Here, in an instance in which the ITLA 121 is used for transmission and reception and thus, the connection is a loopback connection, even when a fine-tune setting is changed, detection by the monitor 131*m* of the DSP 131 continues to be nearly 0.

Figure 5A:
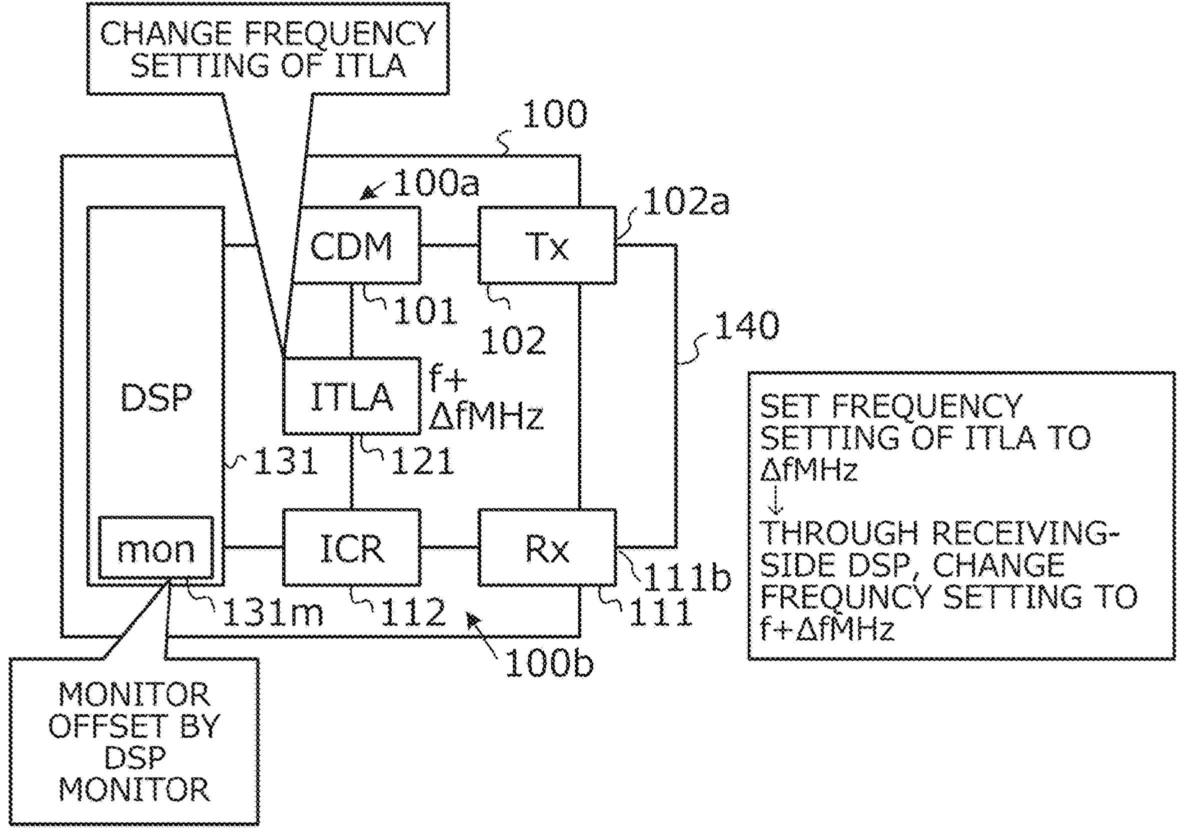
FIG. 5A a is an explanatory diagram of determination of loopback connection by the first determination example.
Figure 5B:
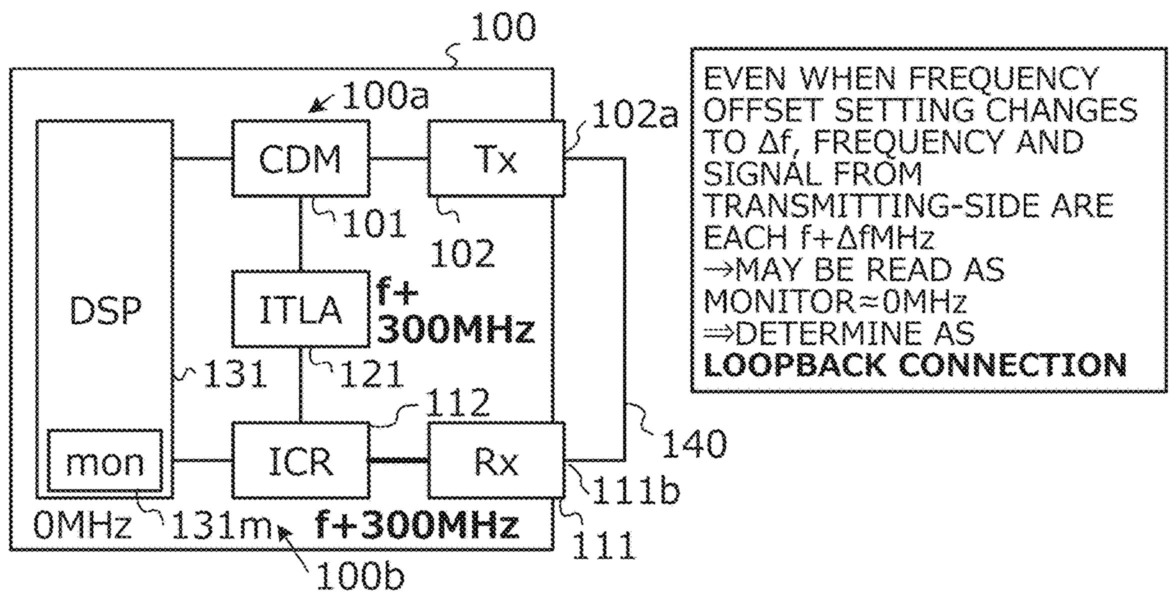
FIG. 5B is an explanatory diagram of the determination of loopback connection by the first determination example.

FIGS. 5A and 5B are explanatory diagrams of determination of loopback connection by the first determination example. As depicted in FIG. 5A, the frequency setting of the ITLA 121 is set to ΔfMHz. Subsequently, through the DSP 131 on the receiving-side, the frequency setting of the ITLA 121 is changed to f+ΔfMHz. The monitor 131*m* of the DSP 131 on the receiving-side detects the offset amount.

Subsequently, as depicted in FIG. 5B, when the setting of the frequency offset has been changed up to Δf, the frequency of an optical signal from the optical transmitter 100*a* and the frequency of the ITLA 121 are both assumed to be f+ΔfMHz. In this instance, when the monitor 131*m* of the DSP 131 on the receiving-side detects the offset amount to be ≈0 MHz, the connection is determined to be a loopback connection.

FIGS. 6A and 6B are explanatory diagrams of determination of a peer-to-peer connection by the first determination example. As depicted in FIG. 6A, with a peer-to-peer connection, a first end of the transmission path 140 is connected to the transmission port 102*a* of the optical transmitter 100*a* of a first one of the optical transceivers 100. Further, a second end of the transmission path 140 is connected to the reception port 111*b* of the optical receiver 100*b* of a second one (communications counterpart) of the optical transceivers 100.

Here, similar to FIG. 5A, first, the frequency setting of the ITLA 121 is set to ΔfMHz. Subsequently, through the DSP 131 on the receiving-side, the frequency setting of the ITLA 121 is changed to f+ΔfMHz. The monitor 131*m* of the DSP 131 on the receiving-side detects the offset amount.

Subsequently, as depicted in FIG. 6B, when the setting of the frequency offset has changed up to Δf, the optical signal from the optical transmitter 100*a* is fMHz and the frequency of the ITLA 121 of the receiving-side is f+ΔfMHz. In this instance, the monitor 131*m* of the DSP 131 on the receiving-side detects the frequency offset amount to be ~ΔfMHz and since the frequency offset amount changes, determines the connection to be a peer-to-peer connection, not a loopback connection.

Figure 7:
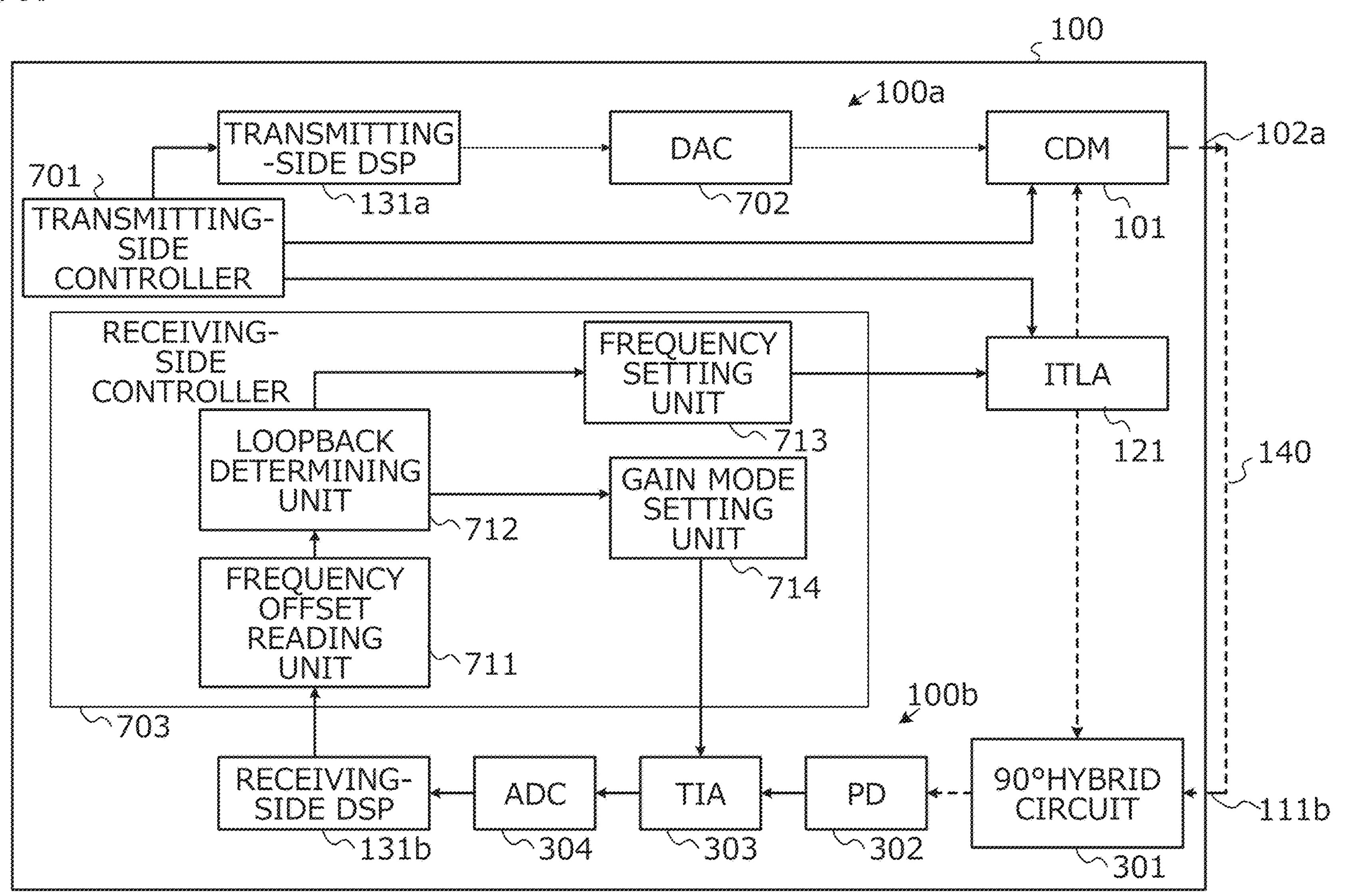
FIG. 7 is a block diagram of functions of the optical transceiver according to the first determination example.

FIG. 7 is a block diagram of functions of the optical transceiver according to the first determination example. Dotted lines in the optical transceiver 100 depicted in FIG. 7 are optical paths such as optical fibers and solid lines are electrical signal paths. The same reference characters used in FIGS. 1 and 3 (the receiving-side) are used for the same components depicted in FIG. 7.

The ITLA 121 outputs locally generated light to the optical transmitter 100*a* (the CDM 101) and the optical receiver 100*b* (the 90-degree hybrid circuit 301).

The optical transmitter 100*a* of the optical transceiver 100 includes the transmitting-side DSP 131*a*, a DAC 702, the CDM 101, and a transmitting-side controller 701. The transmitting-side controller 701 controls the CDM 101, the transmitting-side DSP 131*a*, and the ITLA 121 involved with the transmission of optical signals.

The optical receiver 100*b* includes the 90-degree hybrid circuit 301, the PD 302, the TIA 303, the ADC 304, the receiving-side DSP 131*b*, and a receiving-side controller 703.

The receiving-side controller 703 includes a frequency offset reading unit 711, a loopback determining unit 712, a frequency setting unit 713, and a gain mode setting unit 714.

The frequency offset reading unit 711 reads out the frequency offset amount monitored and detected by the receiving-side DSP 131*b* and outputs the read frequency offset amount to the loopback determining unit 712. The frequency setting unit 713 sets the frequency (including the frequency offset) of the light source output by the ITLA 121.

The loopback determining unit 712 determines whether the connection is a loopback connection, based on the frequency offset amounts read out by the frequency offset reading unit 711 before and after the frequency offset is changed.

The gain mode setting unit 714 sets the gain mode related to the gain control of the TIA 303 to be changeable. The gain mode setting unit 714 sets the gain mode of the TIA 303 to an AGC, during normal operation (during a peer-to-peer connection). Further, in an instance in which a result of determination by the loopback determining unit 712 is "loopback", the gain mode is changed from "AGC" and set to "fixed gain (MGC)".

Figure 8:
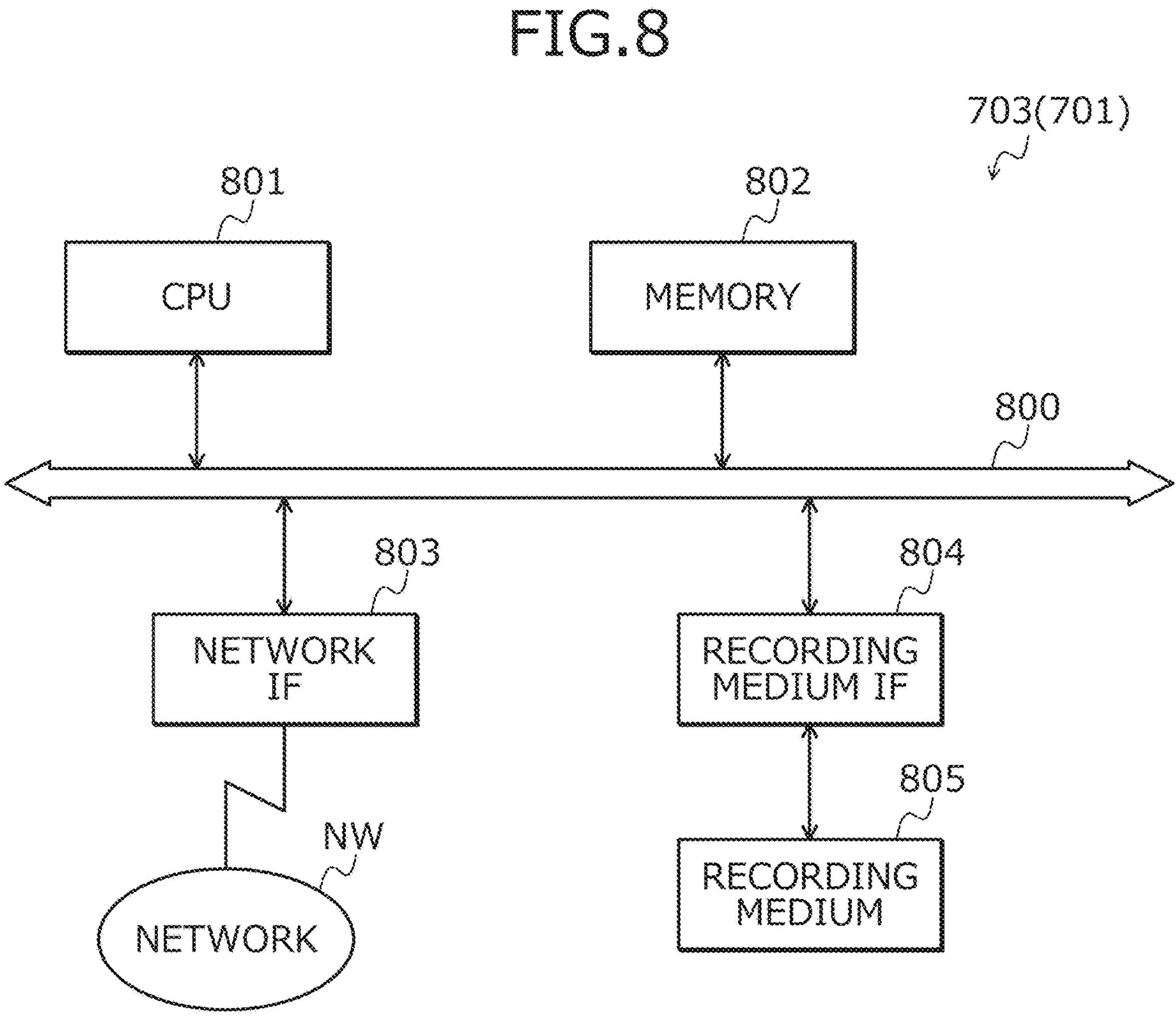
FIG. 8 is a diagram depicting an example of hardware configuration of a controller of the optical transceiver.

FIG. 8 is a diagram depicting an example of hardware configuration of the controller of the optical transceiver. For example, the transmitting-side controller 701 and the receiving-side controller 703 of the optical transceiver 100 may each be configured by general-purpose hardware depicted in FIG. 8.

For example, the receiving-side controller 703 has a processor 801 such as a central processing unit (CPU), a memory 802, a network IF 803, a recording medium interface (IF) 804, and a recording medium 805. Further, the components are connected a bus 800.

Here, the processor 801 is a controller governing overall control of the receiving-side controller 703. The processor 801 may have multiple cores. The memory 802 has, for example, a read only memory (ROM), a random-access memory (RAM), and a flash ROM, etc. In particular, for example, the flash ROM stores control programs, the ROM stores application programs, and the RAM used as a work area of the processor 801. Programs stored in the memory 802 are loaded onto the processor 801, whereby encoded processes are executed by the processor 801.

The network IF 803 administers an interface between a network NW and the receiving-side controller 703; and controls the input and output of information between the receiving-side controller 703 and an external device.

The recording medium IF 804, under the control of the processor 801, controls the reading and writing of data with respect to the recording medium 805. The recording medium 805 stores therein data written thereto under the control of the recording medium IF 804.

In addition to the described components, the receiving-side controller 703 may be connected to, for example, an input device, a display, etc. through an IF.

The processor 801 depicted in FIG. 8 executes programs, whereby the functions of the receiving-side controller 703 depicted in FIG. 7 may be implemented.

The hardware configuration of the receiving-side controller 703 depicted in FIG. 8 may implement a function of a controller of an optical receiver of the optical transceiver 100. In this instance, in addition to functions related to optical reception processes by the optical receiver 100*b*, the hardware configuration depicted in FIG. 8 implements a control function related to determining the presence or absence of a loopback connection by the optical transceiver 100 of the first embodiment.

Further, functions of the transmitting-side controller 701 may also be implemented by the hardware configuration depicted in FIG. 8. Furthermore, the transmitting-side controller 701 and the receiving-side controller 703 may share the hardware configuration depicted in FIG. 8.

Figure 9:
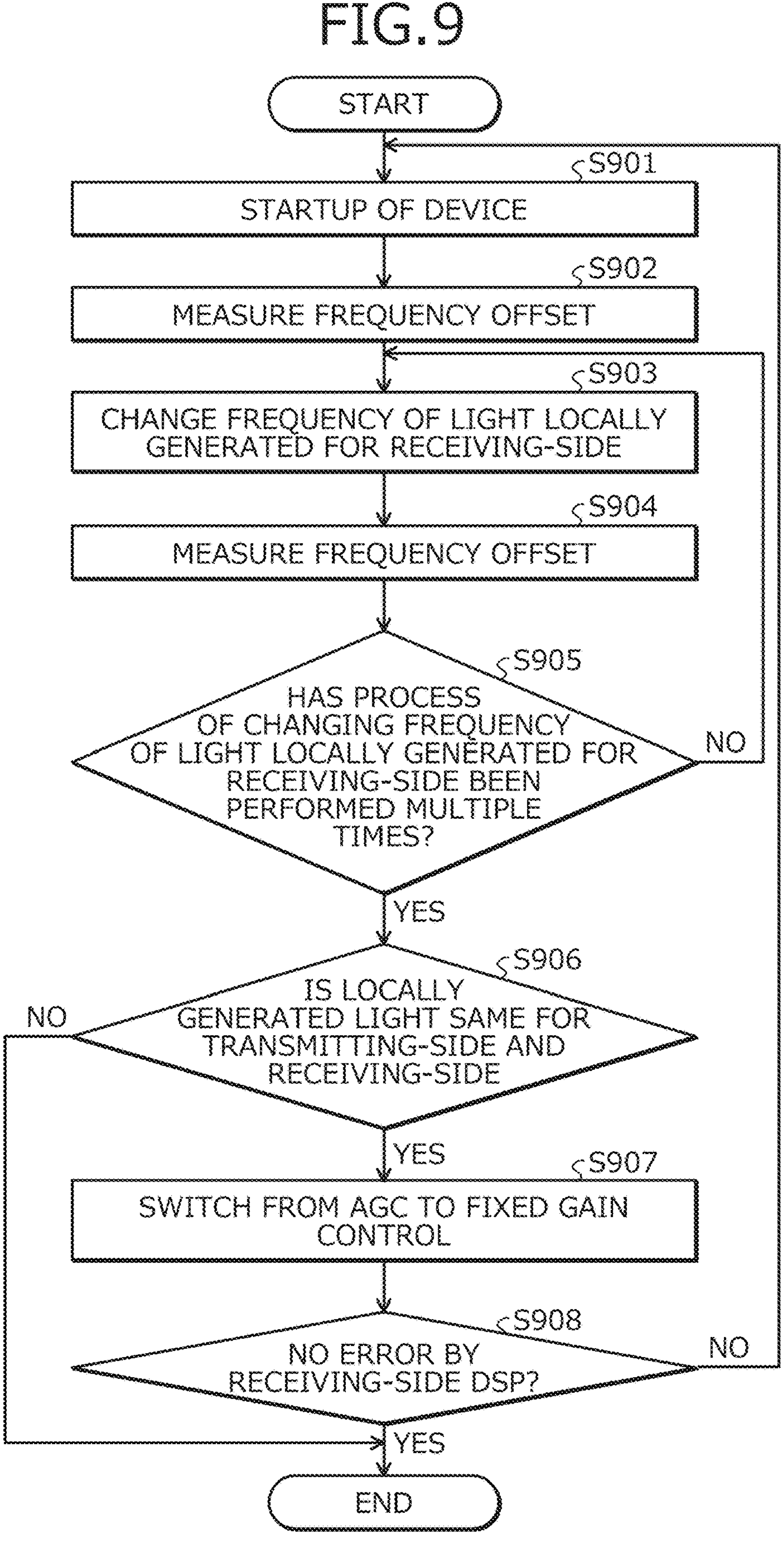
FIG. 9 is a flowchart depicting an example of processes of determining loopback by the first determination example.

FIG. 9 is a flowchart depicting an example of processes of determining loopback by the first determination example. The processes in FIG. 9 are executed by, for example, a controller (the receiving-side controller 703, the processor 801) of the optical transceiver 100.

The controller performs the following process as a consequence of startup of the device (step S901). First, the controller uses the monitor 131*m* of the receiving-side DSP 131*b* to measure the frequency offset at the time startup (step S902). The controller retains the measured frequency offset amount (value).

Next, the controller changes the frequency of the light locally generated for the receiving-side by the ITLA 121 (step S903) and uses the monitor 131*m* of the receiving-side DSP 131*b* to measure the frequency offset at this time (step S904).

Thereafter, the controller repeats (multiple times) a process of changing the frequency of the locally generated light for the receiving-side and measuring the frequency offset (step S905). The controller changes the frequency so that the frequency changes from f to f+Δf and retains the offset value each time.

The controller returns to step S903 and executes a loop of the processes repeatedly until the process at step S905 has been executed multiple times (step S905: NO). Subsequently, when the process has been executed multiple times (step S905: YES), the controller transitions to the process at step S906.

At step S906, the controller determines whether the locally generated light is the same for the transmitting-side and the receiving-side (step S906). For example, the controller determines whether the frequency offset amount measured at step S902 and the frequency offset amounts measured multiple times at step S904 are all within a predetermined range.

The controller, when determining that all the frequency offset amounts are within the predetermined range (step S906: YES), determines that the locally generated light is the same for the transmitting-side and the receiving-side and determines that the same port is used for transmission and reception (loopback connection), the controller then transitions to the process at step S907. On the other hand, when determining that not all the frequency offset amounts are within the predetermined range (step S906: NO), the controller determines that the locally generated light is different for the transmitting-side and for the receiving-side and determines that different ports are used for transmission and reception (peer-to-peer connection) and terminates the process.

The controller may output a determination result obtained at step S906 to an external device. For example, by displaying and thereby outputting the state of the loopback connection, the controller may notify an operator that the connection state of the transmission path 140 with respect to the optical transceiver 100 is loopback.

At step S907, the controller switches the gain control of the TIA 303 from an AGC to a fixed gain control (MGC) (step S907). Thereafter, the controller determines whether no error has occurred by the receiving-side DSP 131*b* (step S908). The controller, when determining that an error has occurred (step S908: NO), returns to the process at step S901. In the other hand, when determining that no error has occurred (step S908: YES), the controller terminates the process.

Figure 10:
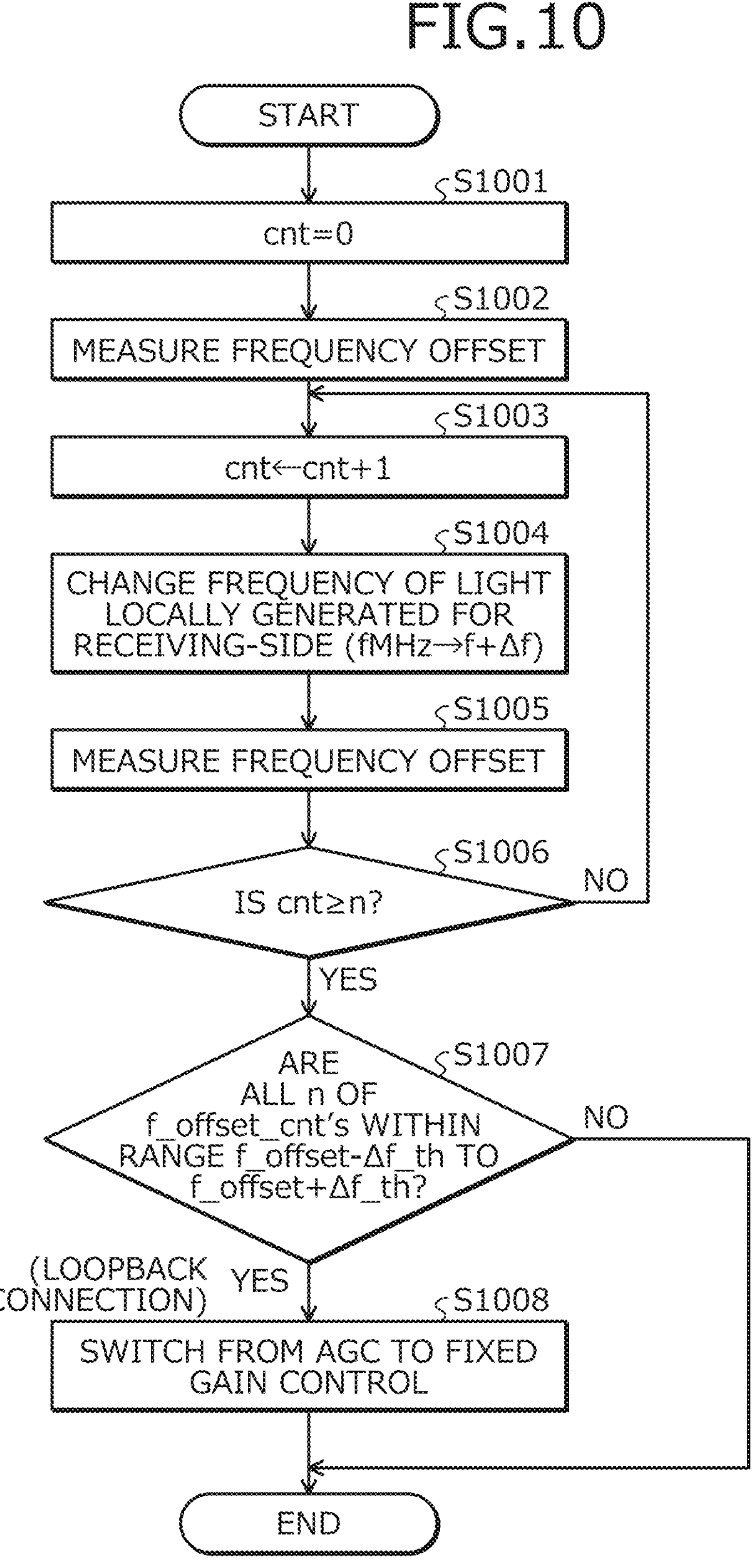
FIG. 10 is a flowchart depicting an example of changing the frequency offset in the processes of the first determination example.

FIG. 10 is a flowchart depicting an example of changing the frequency offset in the processes of the first determination example. FIG. 10 corresponds to a detailed example of the processes at steps S902 to S906 depicted in FIG. 9.

The controller determines in advance the number of times cnt a process related to changing the frequency offset is to be performed and sets the number to "n". Further, the controller sets a threshold that determines the range of the frequency offset to Δf_th.

First, the controller sets a process count cnt to 0 (initial value) (step S1001). Next, the controller measures the frequency offset at the time of startup, using the monitor 131*m* of the receiving-side DSP 131*b* (step S1002). The controller retains the frequency offset measured at this time as "f_offset". Subsequently, the controller increments the process count cnt (step S1003).

Next, the controller changes the frequency of the light generated locally for the receiving-side by the ITLA 121 (step S1004). For example, the controller changes fMHz to f+Δf. Subsequently, the controller measures the frequency offset at this time, using the monitor 131*m* of the receiving-side DSP 131*b* (step S1005). The controller retains the frequency offset measured at this time as "f_offset_cnt".

Thereafter, the controller determines whether the process count cnt is at least n (step S1006). When determining that the process count cnt is less than n (step S1006: NO), the controller returns to the process at step S1003. On the other hand, when determining that the process count cnt is at least n (step S1006: YES), the controller transitions to the process at step S1007. As described, the controller repeatedly performs n times, the process of changing the frequency of the light generated locally for the receiving-side and measuring the frequency offset.

Subsequently, the controller determines whether all n of the f_offset_cnt's measured, respectively, for the frequency offset changes are within a threshold range (f_offset−Δf_th or greater, but not more than f_offset+Δf_th) (step S1007).

At step S1007, when all n of the f_offset_cnt's are within the threshold range (step S1007: YES), the controller determines that the transmission path 140 is a loopback connection, switches the gain control of the TIA 303 from AGC to fixed gain control (MGC) (step S1008), and terminates the process.

On the other hand, at step S1007, when all n of the f_offset_cnt's are not within the threshold range (step S1007: NO), the controller determines that the locally generated light is different for the transmitting-side and the receiving-side and determines that separate ports are used for transmission and reception (peer-to-peer connection), the controller terminates the process without performing any particular processes.

Figure 11A:
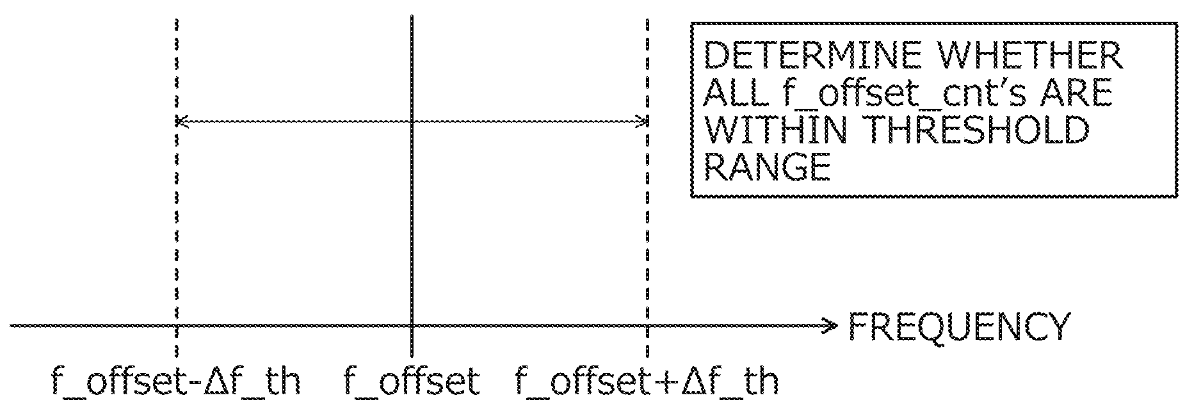
FIG. 11A is an explanatory diagram of a relationship between a threshold and frequency offset in a process of the first determination example.
Figure 11B:
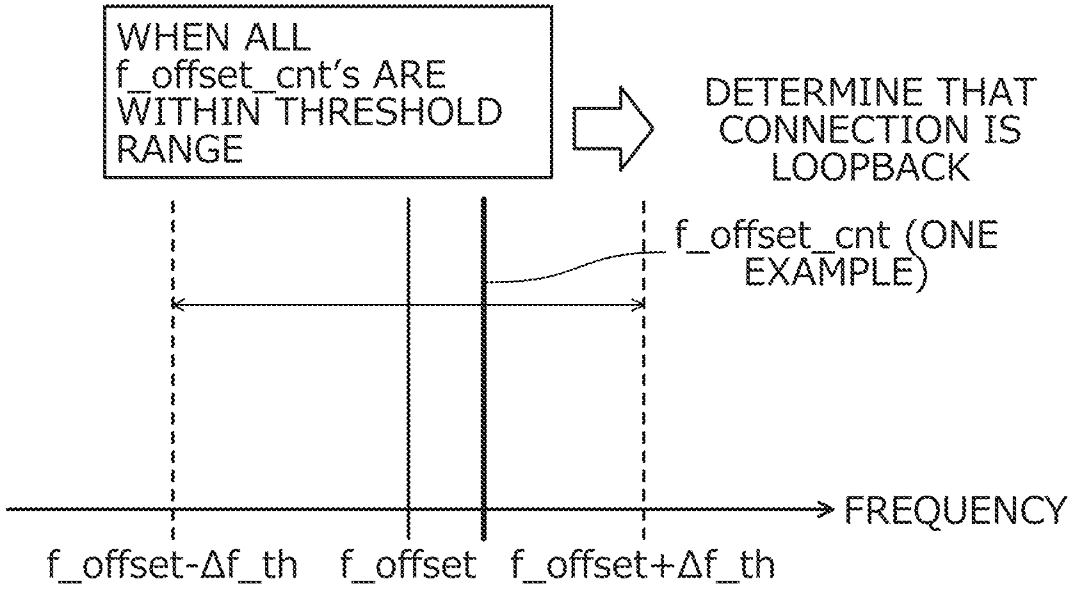
FIG. 11B is an explanatory diagram of the relationship between the threshold and frequency offset in a process of the first determination example.
Figure 11C:
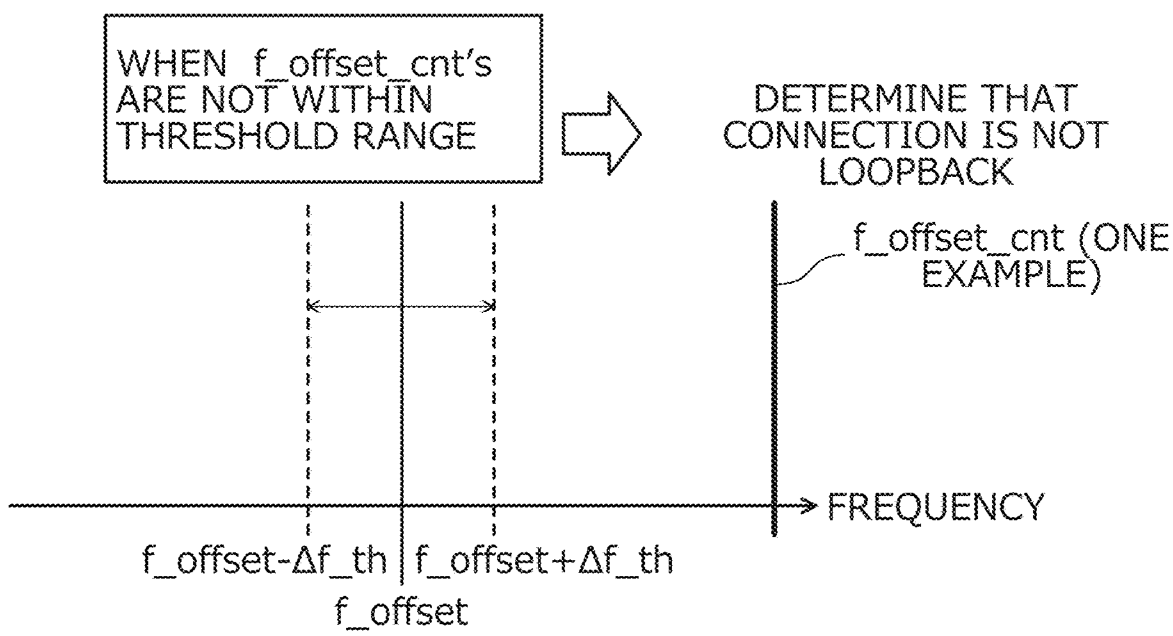
FIG. 11C is an explanatory diagram of the relationship between the threshold and frequency offset in a process of the first determination example.

FIGS. 11A, 11B, and 11C are explanatory diagrams of a relationship between a threshold and frequency offset in a process of the first determination example. A horizontal axis indicates frequency while a vertical axis indicates optical power. Values of power are not depicted and positions of measured values on the frequency axis are shown. With reference to FIGS. 11A, 11B, and 11C, f_offset, f_offset_cnt, and the threshold range (f_offset−Δf_th, f_offset+Δf_th) in FIG. 10 are described.

FIG. 11A depicts a relationship between f_offset, f_offset_cnt, and lower and upper threshold values (f_offset−Δf_th, f_offset+Δf_th). At step S1007, it is determined whether f_offset_cnt is positioned within a range of the threshold values (f_offset−Δf_th and f_offset+Δf_th) that are set centered around f_offset. The offset amount varied on the transmitting-side is varied within this threshold range.

For example, FIG. 11B depicts a state in which the n measured f_offset_cnt's are positioned within the range of the threshold values (f_offset-Δf_th and f_offset+Δf_th). In this instance, the controller determines a loopback connection. As depicted in FIG. 11C, when the n measured f_offset_cnt's are outside the range of the threshold values, the controller determines that the connection is not a loopback connection.

Figure 12:
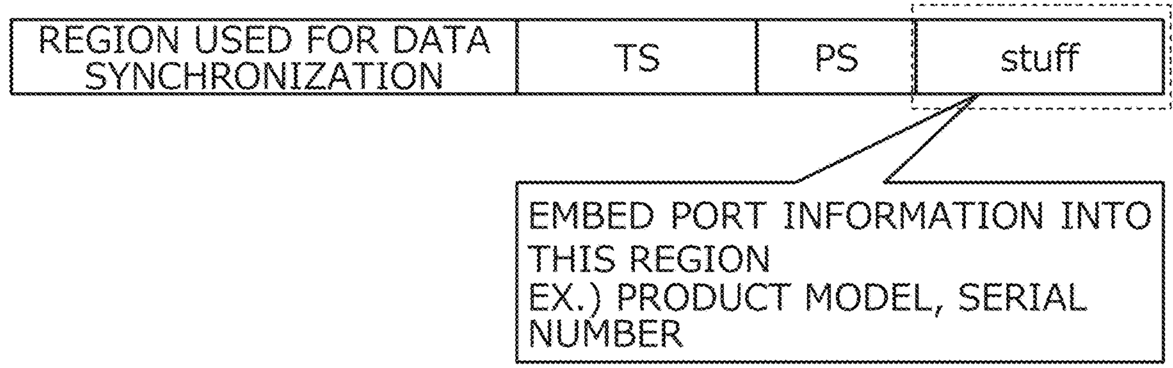
FIG. 12 is an explanatory diagram of a second determination example in an instance of loopback.

FIG. 12 is an explanatory diagram of a second determination example in an instance of loopback. In the second determination example, the optical transceiver 100 embeds an ID of the optical transmitter 100*a* (the optical transceiver 100) in an optical signal S to be transmitted. Subsequently, the optical receiver 100*b* determines whether the ID received thereby matches the ID thereof (the optical transceiver 100) and when the received ID matches, the optical receiver 100*b* determines that the transmission path 140 is a loopback connection.

As depicted in FIG. 12, the optical signal S includes a region used for data synchronization, a training sequence (TS), pilot symbol (PS), and an available region (Stuff). Subsequently, the controller of the optical transmitter 100*a* embeds, in the available region, port information, for example, a product model, a serial number, etc. as the ID of the device thereof.

An available region for insertion of the ID is a region in which errors do not easily occur in QPSK and transmission failures do not occur. Forward error correction (FEC) is also embedded in the pilot symbol PS on the firmware to correct errors. While FEC is performed on data to be inserted, FEC is not performed in the transmitting-side DSP 131*a*.

Figure 13:
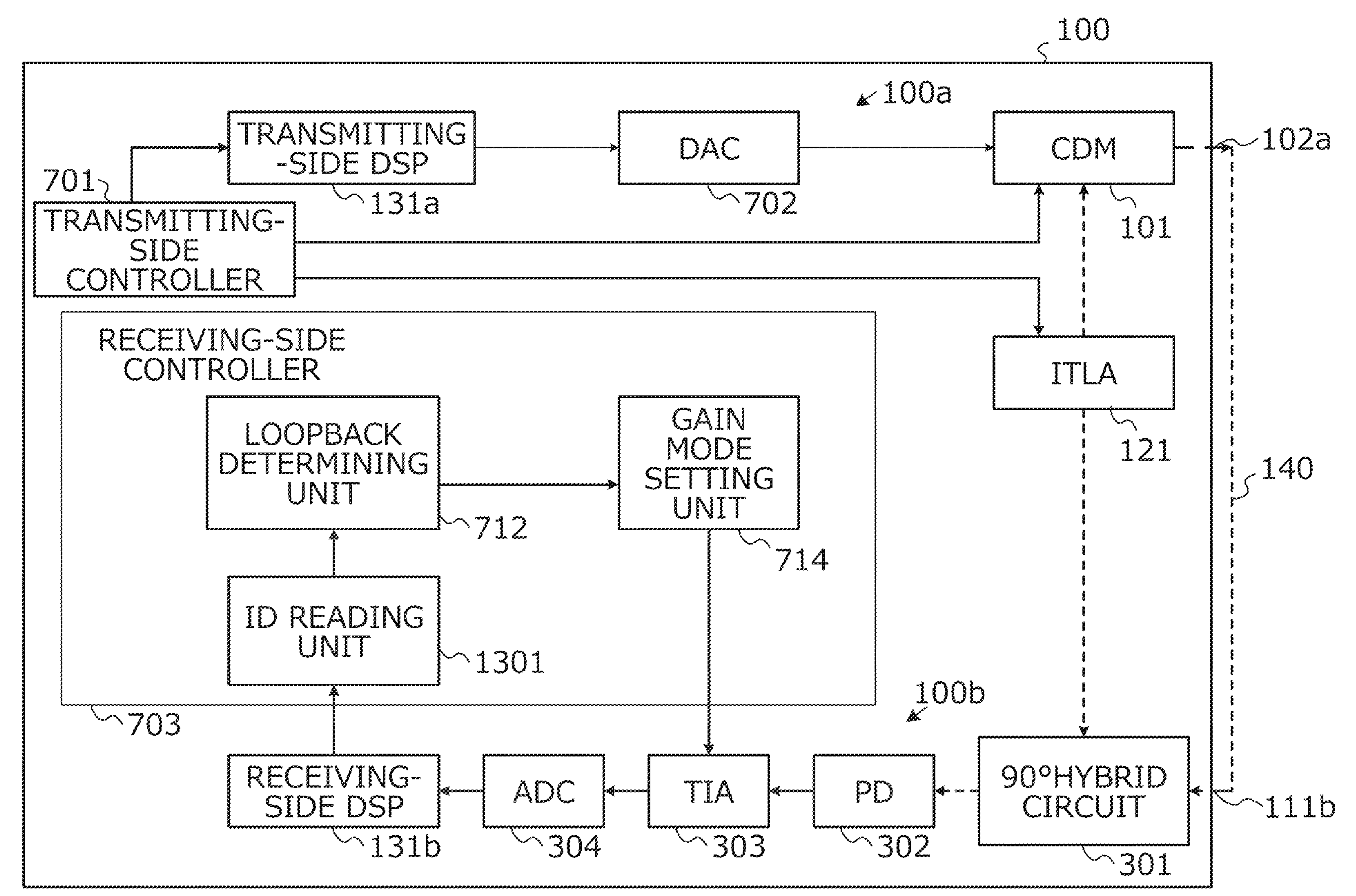
FIG. 13 is a block diagram of the functions of the optical transceiver of the second determination example.

FIG. 13 is a block diagram of functions of the optical transceiver of the second determination example. The same reference characters used in the first determination example (FIG. 7) are used for the same components depicted in FIG. 13. The configuration example depicted in FIG. 13 differs from the first determination example (FIG. 7) in that configuration of the frequency setting unit 713 is omitted and the receiving-side controller 703 further has an ID reading unit 1301.

In the second determination example, the transmitting-side controller 701 of the optical transmitter 100*a* of the optical transceiver 100 embeds, into an available region of an optical signal to be transmitted, the ID of the device (the optical transceiver 100) of the transmitting-side controller 701, for example, the port information of the transmission port 102*a*.

The ID reading unit 1301 of the optical receiver 100*b* reads out the ID included in the available region of a received optical signal. The loopback determining unit 712 determines whether the connection is a loopback connection, based on whether the ID read out by the ID reading unit 1301 matches the ID of the optical transceiver 100 of the loopback determining unit 712, and outputs a determination result to the gain mode setting unit 714.

FIG. 14 is a flowchart depicting an example of processes of determining loopback by the second determination example. The process in FIG. 14, for example, is executed by the controller (the transmitting-side controller 701 and the receiving-side controller 703, the processor 801) of the optical transceiver 100.

First, the transmitting-side controller 701, as a consequence of startup of the device (step S1401), inserts the ID of the optical transceiver 100 thereof into the transmission data (step S1402). The inserted ID is, for example, port information of the transmission port 102*a* of the device (the optical transceiver 100) of the transmitting-side controller 701 and, for example, is stored to and retained in the memory 802.

Next, the receiving-side controller 703 extracts the ID (port information) from reception data received via a reception port 111*b* (step S1403). Next, the receiving-side controller 703 determines whether the ID of the transmitting-side and the ID of the receiving-side match (step S1404). When the ID (port information) stored in the memory 802 of the device of the receiving-side controller 703 does not match the ID (port information) extracted from the reception data (step S1404: NO), the receiving-side controller 703 determines that the transmission path 140 is a peer-to-peer connection and terminates the process without performing any particular processes.

The receiving-side controller 703, when determining that the ID (port information) stored in the memory 802 of the device of the receiving-side controller 703 matches the ID (port information) extracted from the reception data (step S1404: YES), determines that the transmission path 140 is a loopback connection. Subsequently, the receiving-side controller 703 switches the gain control of the TIA 303 from AGC to fixed gain control (MGC) (step S1405).

Thereafter, the receiving-side controller 703 determines whether no error has occurred by the receiving-side DSP 131*b* (step S1406). The receiving-side controller 703, when determining that an error has occurred (step S1406: NO), returns to the process at step S1401. On the other hand, when determining that no error has occurred (step S1406: YES), the receiving-side controller 703 terminates the process.

Next, a second embodiment is described. In the second embodiment, the optical transmitter 100*a* and the optical receiver 100*b* use, respectively, different light sources independent of one another. Further, in the second embodiment, as a method of confirming whether the frequency offset is measurable, whether the connection is a loopback connection is determined based on variation of signal bandwidth (spectrum) and an adjustment function of a reception laser of the optical receiver 100*b*. In this instance, even during a state when no signal is being communicated to the DSP 131 (the receiving-side DSP 131*b*), whether the connection is a loopback connection may be determined.

Figure 15:
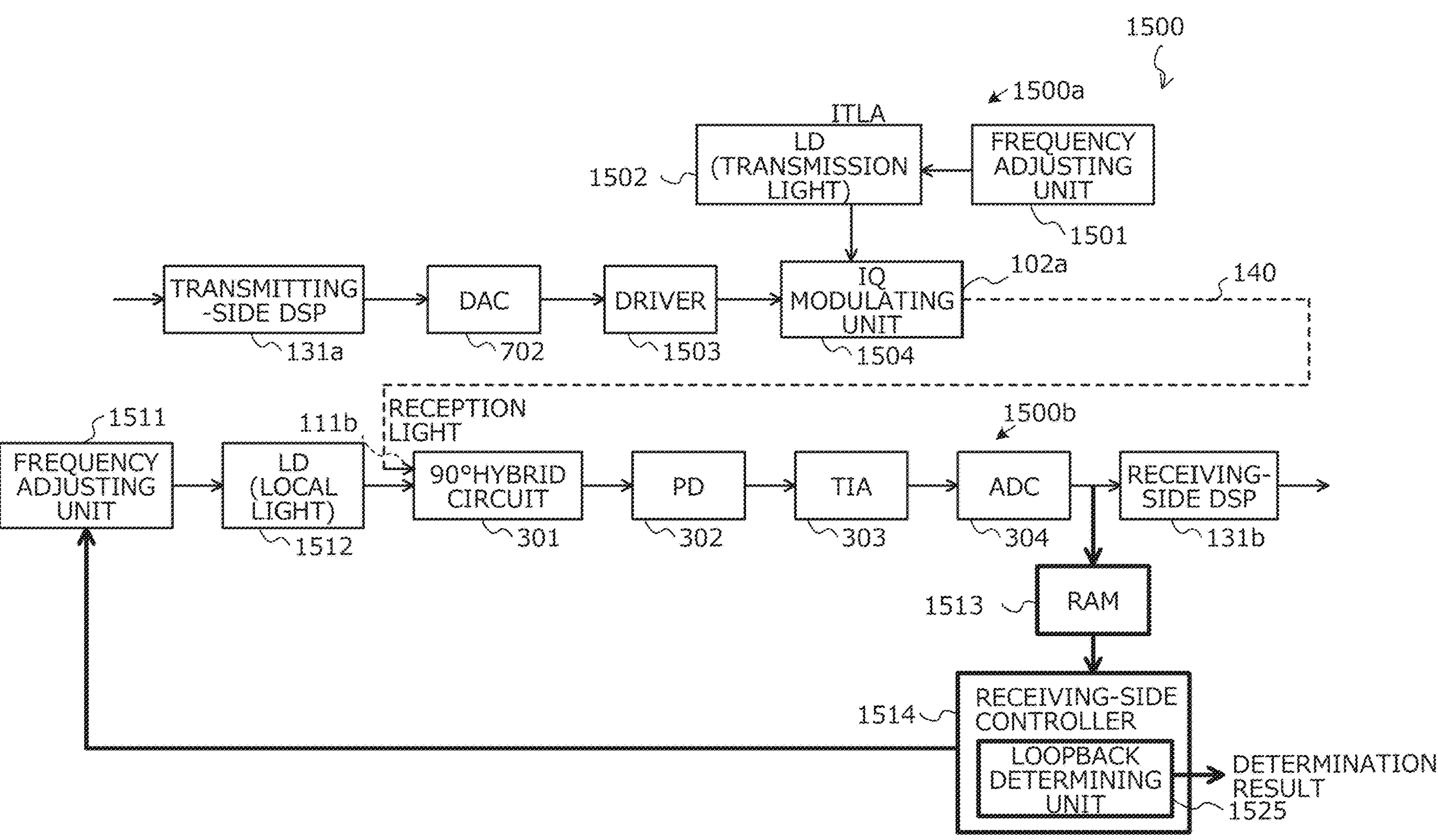
FIG. 15 is a block diagram depicting an example of a configuration of the optical transceiver according to a second embodiment.

FIG. 15 is a block diagram depicting an example of a configuration of the optical transceiver according to the second embodiment. In an optical transceiver 1500 depicted in FIG. 15, components that are the same as those in the first embodiment described above (for example, the optical transceiver 100 depicted in FIG. 7) are given the same reference numerals used in the first embodiment. In the configuration example depicted in FIG. 15, a receiving-side controller 1514 obtains data immediately downstream from the ADC 304 and determines whether the connection is a loopback connection.

In an optical transmitter 1500*a* of the optical transceiver 1500, a frequency adjusting unit 1501 and an LD 1502 for transmission light are provided, the wavelength (frequency) of the transmission light output from the LD 1502 is adjusted by the frequency adjusting unit 1501, and the transmission light is output to an IQ modulating unit 1504. The IQ modulating unit 1504 uses the transmission light output by the LD 1502 and thereby IQ-modulates transmission-side data output by a driver 1503, the IQ modulating unit 1504 outputs and transmits the IQ-modulated data from the transmission port 102*a*. For example, an ITLA may be used for the LD 1502.

In an optical receiver 1500*b* of the optical transceiver 1500, a frequency adjusting unit 1511 and an LD 1512 for locally generating light (LO light) are provided, the wavelength (frequency) of the locally generated light output by the LD 1512 is adjusted by the frequency adjusting unit 1511 and input to the 90-degree hybrid circuit 301.

FIG. 15 depicts, as a state of loopback connection, a loopback connection in which the transmission port 102*a* and the reception port 111*b* (input of the 90-degree hybrid circuit 301) of the optical transceiver 1500 are connected to each other by the transmission path (optical fiber) 140.

Further, in the optical receiver 1500*b* of the optical transceiver 1500, output (reception data) of the ADC 304 is connected to the receiving-side DSP 131*b* and is further connected to a RAM 1513. The RAM 1513 stores therein output (reception data) of the ADC 304. For example, the RAM 1513 stores therein reception data (reception data 1) of an instance when the frequency of the LD 1512 is not changed and reception data (reception data 2) of an instance when the frequency of the LD 1512 is changed.

The receiving-side controller 1514 variably controls the frequency of the LD 1512 (locally generated light) via the frequency adjusting unit 1511. The receiving-side controller 1514 variably controls the frequency of the LD 1512 (locally generated light) by an amount equivalent to an offset (for example, +5 GHz). A loopback determining unit 1525 of the receiving-side controller 1514 determines whether the connection is a loopback connection, based on the amount of change in the frequency of the reception data in the RAM 1513 before and after the variable control is performed.

FIG. 16 is a block diagram of the functions of the receiving-side controller. The receiving-side controller 1514 obtains the reception data 1, 2 for determining a loopback connection. As the reception data 1, reception data of an instance when the frequency of the LD 1512 of the optical receiver 1500*b* is not changed is used. Further, as the reception data 2, reception data of an instance when the frequency of the LD 1512 of the optical receiver 1500*b* is changed is used.

The receiving-side controller 1514 may be configured by, for example, hardware using the CPU 801 depicted in FIG. 8. Additionally, the receiving-side controller 1514 may be configured by an application specific integrated circuit (ASIC), a field programmable gate array (FPGA), etc. The receiving-side controller 1514 includes multiple frequency-amplitude information converting units 1601, a frequency change calculating unit 1602, multiple determination signal generating units 1603, and the loopback determining unit 1525 described above.

In the example depicted in FIG. 16, the frequency-amplitude information converting units 1601 include three frequency-amplitude information converting unit 1601*a*, 1601*b*, 1601*c*. The first frequency-amplitude information converting unit 1601*a* converts first data (reception data having a predetermined signal bandwidth when the frequency of the LD 1512 is not changed: the reception data 1) stored by the RAM 1513, into amplitude information (first frequency characteristic) of the frequency. The second frequency-amplitude information converting unit 1601*b* converts second data (reception data when the frequency of the LD 1512 is changed by the offset amount (+5 GHZ): the reception data 2) stored by the RAM 1513, into amplitude information (second frequency characteristic) of the frequency.

The reception data of an instance when the frequency of the LD 1512 is changed by the offset amount (+5 GHZ) is restored by canceling the offset amount by the calculation by the frequency change calculating unit 1602 and is input to the third frequency-amplitude information converting unit 1601*c*. The third frequency-amplitude information converting unit 1601*c* converts third data (reception data for which the frequency of the LD 1512 is restored) stored by the RAM 1513, into amplitude information (third frequency characteristic) of the frequency.

Output of the first frequency-amplitude information converting unit 1601*a* is output to a first determination signal generating unit (1603*a*) and a second determination signal generating unit (1603*b*). Output of the second frequency-amplitude information converting unit 1601*b* is output to the first determination signal generating unit (1603*a*). Output of the third frequency-amplitude information converting unit 1601*c* is output to the second determination signal generating unit (1603*b*).

The first determination signal generating unit (1603*a*) generates a first determination signal for determining whether the connection is a loopback connection and outputs the first determination signal to the loopback determining unit 1525. The second determination signal generating unit (1603*b*) generates a second determination signal for determining whether the connection is a loopback connection and outputs the second determination signal to the loopback determining unit 1525.

The first and second determination signal generating units 1603*a*, 1603*b*) each includes a difference calculating unit 1611, a negative frequency band symbol-inverting unit 1612, a summing unit 1613, and an absolute value calculating unit 1614.

The difference calculating unit 1611 calculates a difference of a pair reception data (frequency characteristics) input thereto. The negative frequency band symbol-inverting unit 1612 inverts, in the reception data after the difference calculation, negative symbols into positive symbols and outputs the resulting data. The summing unit 1613 sums levels of the data output by the negative frequency band symbol-inverting unit 1612 and outputs the result. The absolute value calculating unit 1614 calculates the absolute value of the reception data after the summation and outputs the result to the loopback determining unit 1525. In FIG. 16, while the difference calculating unit 1611 to the absolute value calculating unit 1614 are depicted to be configured in a portion of the second determination signal generating unit (1603*b*), the difference calculating unit 1611 to the absolute value calculating unit 1614 are further configured in the first determination signal generating unit (1603*a*).

The loopback determining unit 1525 compares the first and second determination signals output by the first and second determination signal generating units 1603*a*, 1603*b*) and based on a result of the comparison, outputs a determination result regarding whether the connection is a loopback connection. The first and second determination signals have large and small values and based on the combination of the large and small values of the first and second determination signals, the loopback determining unit 1525 may simply determine whether the connection is a loopback connection (described in detail hereinafter).

Figure 17A:
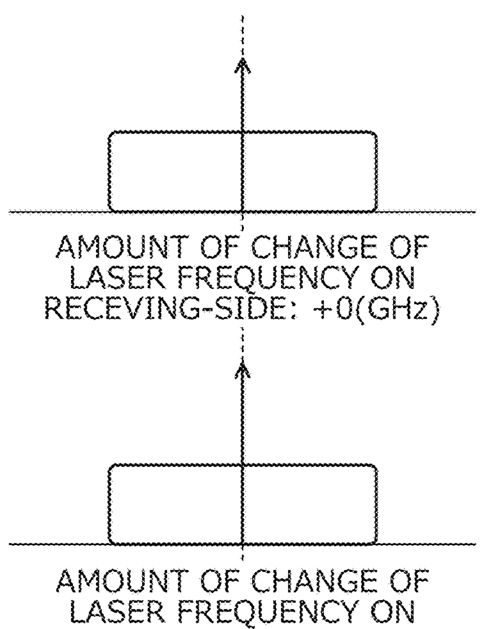
FIG. 17A is a diagram depicting correspondence between changes in laser frequency on the receiving-side when the connection is a loopback connection.
Figure 17B:
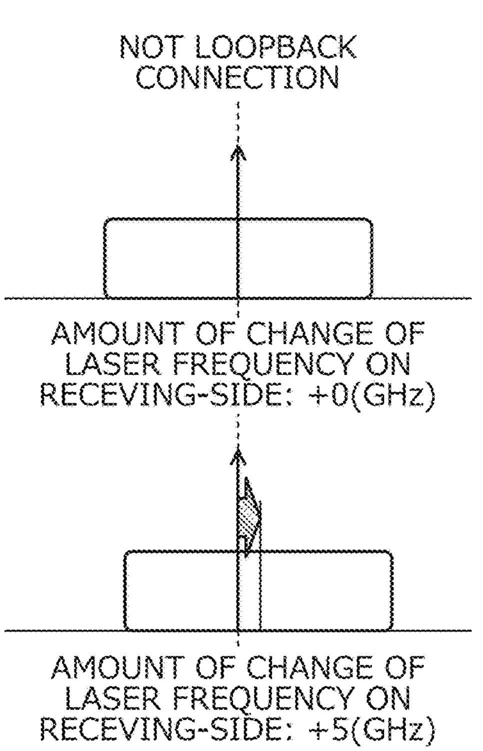
FIG. 17B is a diagram depicting correspondence between changes in the laser frequency on the receiving-side when the connection is not a loopback connection.

FIGS. 17A and 17B are diagrams depicting correspondence between changes in the laser frequency on the receiving-side and presence/absence of a loopback connection. In the second embodiment, a relationship between the presence/absence of a loopback connection and the center frequency of the reception data at the time of a frequency change of the LD 1512 (locally generated light) of the optical receiver 1500*b* is shown. The reception data depicted in FIGS. 17A and 17B corresponds to data input to the frequency-amplitude information converting units 1601*a* to 1601*c* in FIG. 16.

FIG. 17A shows the amount of change of the frequency in an instance of a loopback connection. A horizontal axis indicates frequency. In an instance of a loopback connection, the center frequency of the reception data does not change regardless of whether the change in the frequency of the LD 1512 is 0 GHz or the offset amount (+5 GHZ). On the other hand, FIG. 17B depicts the amount of change of the frequency in an instance of no loopback connection. In an instance of no loopback connection, when the amount of change in the frequency of the LD 1512 is 0 GHz, the center frequency of the reception data does not change, however, when the frequency is changed by the offset amount (+5 GHZ), the center frequency of the reception data also changes by the offset amount (+5 GHZ).

Figure 18:
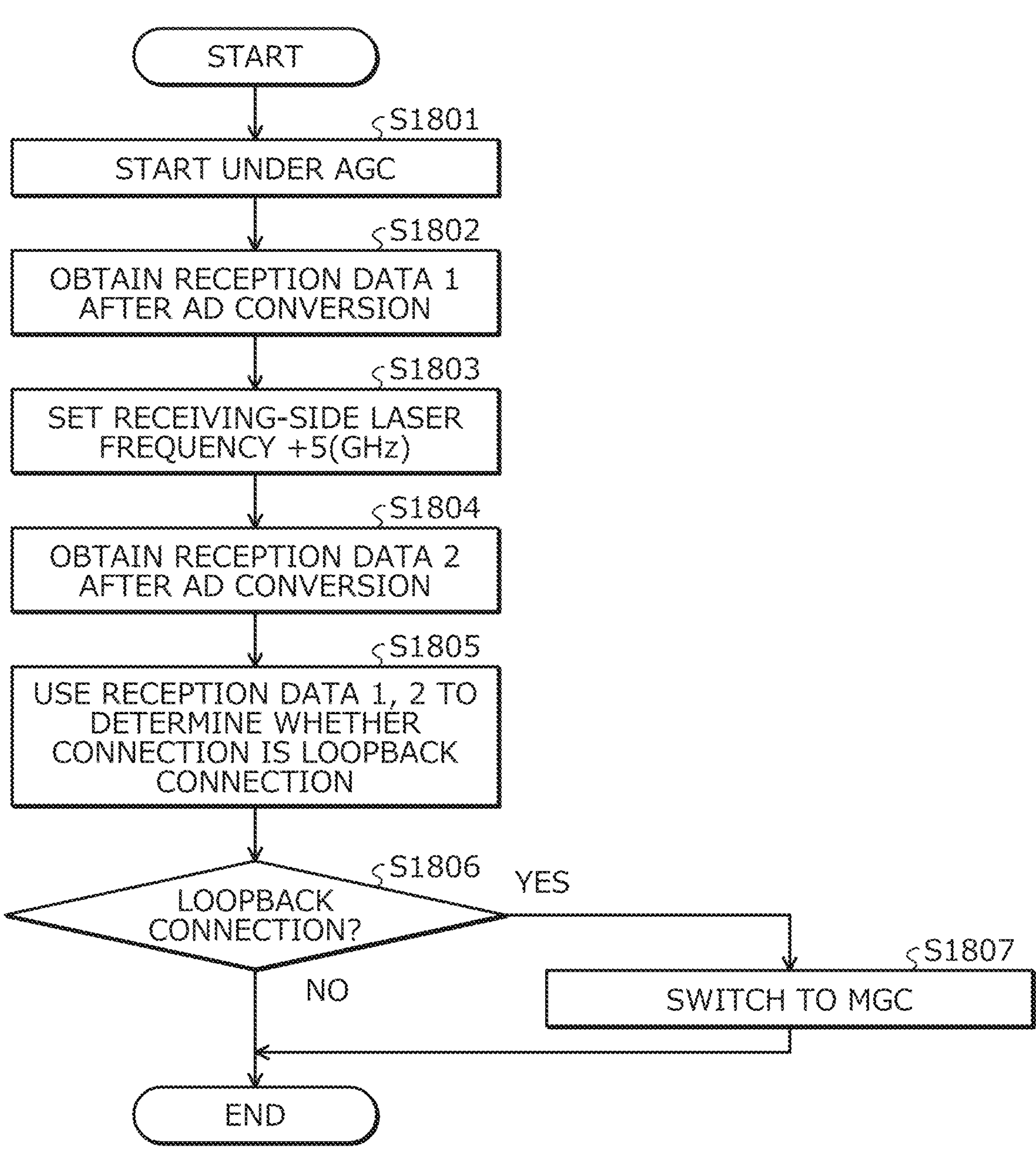
FIG. 18 is a flowchart depicting an example of processes of determining loopback connection in the second embodiment.

FIG. 18 is a flowchart depicting an example of processes of determining loopback connection in the second embodiment. The processes in FIG. 18 are processes executed by the receiving-side controller 1514 depicted in FIG. 15. First, the receiving-side controller 1514, in an initial state, starts control of reception gain by the AGC (step S1801). Next, the receiving-side controller 1514 obtains the reception data 1 after AD conversion by the ADC 304 (step S1802). The reception data 1 is reception data of an instance when the frequency of the LD 1512 is not changed, the reception data 1 is obtained from the RAM 1513.

Next, the receiving-side controller 1514 performs settings to change the laser frequency of the LD 1512 by the offset amount (+5 GHZ) (step S1803). The offset amount of the frequency is not limited to +5 GHz and suffices to be within a range capable of the LD 1512.

Next, the receiving-side controller 1514 obtains the reception data 2 after AD conversion by the ADC 304 (step S1804). The reception data 2 is reception data of an instance when the frequency of the LD 1512 is changed; the reception data 2 is obtained from the RAM 1513.

Next, the receiving-side controller 1514 uses the obtained reception data 1, 2 to perform a determination process regarding whether the connection is a loopback connection (step S1805) and determines whether the connection is a loopback connection (step S1806). When the determination result is that the connection is a loopback connection (step S1806: YES), the receiving-side controller 1514 switches the gain control from the AGC control to a fixed gain control (MGC) (step S1807) and terminates the processes above. On the other hand, when the determination result is that the connection is not a loopback connection (step S1806: NO), the receiving-side controller 1514 does not change the gain control and terminates the processes, leaving the gain control under the AGC control.

Figure 19B:
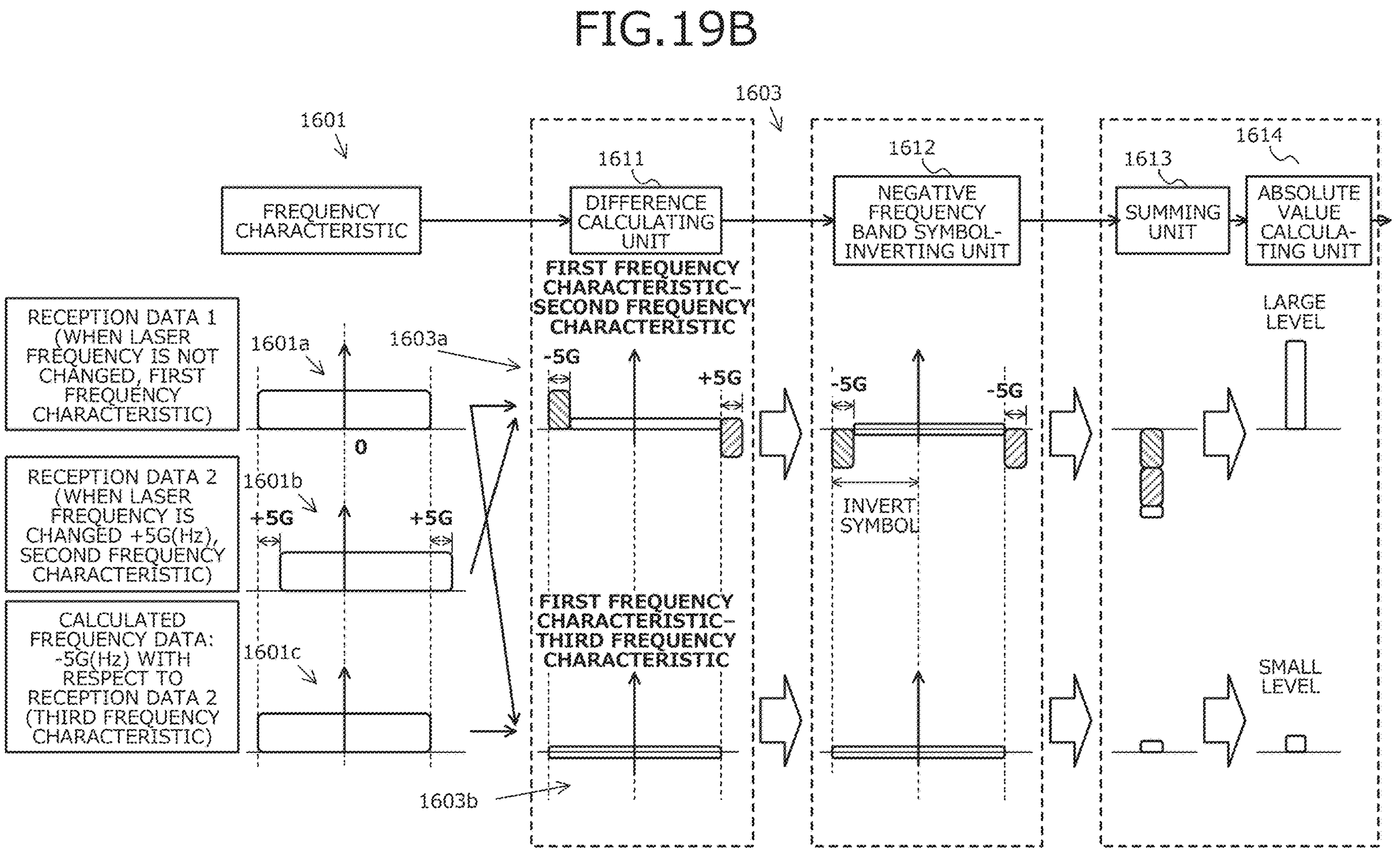
FIG. 19B is a diagram depicting examples of data of each unit of the determination signal generating unit when the connection is not a loopback connection.

FIG. 19A is a diagram depicting examples of data of each unit of the determination signal generating unit in when the connection is a loopback connection and FIG. 19B is a diagram depicting examples of data of each unit of the determination signal generating unit in when the connection is not a loopback connection. In FIGS. 19A and 19B, examples of the data of each of the units (the difference calculating unit 1611 to the absolute value calculating unit 1614) of the first and second determination signal generating units (1603*a*, 1603*b*) depicted in FIG. 16 are depicted and a horizontal axis indicates frequency while a vertical axis indicates values corresponding to optical power.

The reception data is converted into amplitude information (frequency characteristic) of the frequency by the frequency-amplitude information converting units 1601. In an instance of the loopback connection depicted in FIG. 19A, the first and second frequency characteristics each has a predetermined signal bandwidth with a center frequency as a center and signal bandwidths of the first and second frequency characteristics match. In contrast, the signal bandwidth of the third frequency characteristic is shifted by −5 GHz overall with respect to the reception data 2 (second frequency characteristic) by the frequency change calculating unit 1602, and the signal bandwidths of the first and third frequency characteristics do not match. The first and second determination signal generating units (1603*a*, 1603*b*) generate the first and second determination signals based on whether the signal bandwidths of the first and second frequency characteristics match and whether the signal bandwidths of the first and third frequency characteristics match.

Similar to FIG. 16, data of the first frequency characteristic is input to the first and second determination signal generating units (1603*a*, 1603*b*). Data of the second frequency characteristic is input to the first determination signal generating unit (1603*a*). Data of the third frequency characteristic is input to the second determination signal generating unit (1603*b*).

As for data on the first determination signal generating unit (1603*a*) side, the difference calculating unit 1611 calculates the difference of the first and second frequency characteristics (first frequency characteristic-second frequency characteristic) and the predetermined level is small (close to 0) and uniform in the entire signal bandwidth. Thereafter, the negative frequency band symbol-inverting unit 1612 outputs the data as is without inverting the symbols and at the summing unit 1613, the data has the predetermined level. The absolute value calculating unit 1614 outputs data of a small predetermined level, as an absolute value.

As for data on the second determination signal generating unit (1603*b*) side, the difference calculating unit 1611 calculates the difference of the first and third frequency characteristics (first frequency characteristic-third frequency characteristic), whereby predetermined levels (±) occur, respectively, at the ends of the signal bandwidth. At low frequencies of the signal bandwidth, a negative (−) level occurs and at high frequencies of the signal bandwidth, a positive level (+) occurs. Thereafter, the negative frequency band symbol-inverting unit 1612 converts negative (−) symbols into positive (+) symbols, and the summing unit 1613 sums signal bandwidth and the levels at both ends of the signal bandwidth. The absolute value calculating unit 1614 outputs data of a large predetermined level, as an absolute value.

As described, in an instance of a loopback connection, the first determination signal generating unit (1601*a*) outputs data of a small level (the first determination signal) and the second determination signal generating unit (1601*b*) outputs data of a large level (the second determination signal) as compared to the first determination signal generating unit (1601*a*). In this manner, while description is given using large and small levels, when the reception data 1, 2 have the same level, the level of the first determination signal output by the first determination signal generating unit (1603*a*) is nearly 0 while the level of the second determination signal output by the second determination signal generating unit (1603*b*) has a predetermined level difference.

Next, in the instance of no loopback connection depicted in FIG. 19B (peer-to-peer connection), the first and third frequency characteristics each has a predetermined signal bandwidth with a center frequency as a center. In contrast, the signal bandwidth of the second frequency characteristic is shifted overall by +5 GHz with respect to the reception data 2 (second frequency characteristic). As a result, the signal bandwidths of the first and second frequency characteristics do not match while the signal bandwidths of the first and third frequency characteristics match.

Similar to FIG. 16, data of the first frequency characteristic is input to the first and second determination signal generating units (1603*a*, 1603*b*). Data of the second frequency characteristic is input to the first determination signal generating unit (1603*a*). Data of the third frequency characteristic is input to the second determination signal generating unit (1603*b*).

As for data on the first determination signal generating unit (1603*a*) side, the difference calculating unit 1611 calculates the difference of the first and second frequency characteristics (first frequency characteristic-second frequency characteristic), whereby predetermined levels (±) occur, respectively, at the ends of the signal bandwidth. At low frequencies of the signal bandwidth, a positive (+) level occurs and at high frequents of the signal bandwidth, a negative (−) level occurs. Thereafter, the negative frequency band symbol-inverting unit 1612 converts positive (+) symbols into negative (−) symbols, and the summing unit 1613 sums the signal bandwidth and the levels at both ends of the signal bandwidth. The absolute value calculating unit 1614 outputs data (the first determination signal) of a large predetermined level, as an absolute value.

As for data on the second determination signal generating unit (1603*b*) side, the difference calculating unit 1611 calculates the difference of the first and third frequency characteristics (first frequency characteristic-third frequency characteristic), whereby the predetermined level is small (close to 0) and uniform in the entire signal bandwidth. Thereafter, the negative frequency band symbol-inverting unit 1612 outputs the data as is without inverting the symbols and at the summing unit 1613, the data has the predetermined level. The absolute value calculating unit 1614 outputs data of a small predetermined level (the second determination signal), as an absolute value.

As described, in an instance of no loopback connection, the first determination signal generating unit (1601*a*) outputs data of a large level (the first determination signal) and the second determination signal generating unit (1601*b*) outputs data of small level (the second determination signal) as compared to the first determination signal generating unit (1601*a*).

FIG. 20 is a diagram depicting determination conditions for determining whether the connection is a loopback connection. The loopback determining unit 1525 determines whether the connection is a loopback connection, based on the levels of the first and second determination signals output by the first and second determination signal generating units (1603*a*, 1603*b*).

As depicted in FIG. 20, the loopback determining unit 1525 determines that the connection is a loopback connection when the level of the first determination signal is small and the level of the second determination signal is large. Further, the loopback determining unit 1525 determines that the connection is not a loopback connection (corresponds to a pee-to-peer connection) when the level of the first determination signal is large and the level of the second determination signal is small.

The loopback determining unit 1525, for example, may set a threshold at an intermediate value of the difference of the large and small levels of the determination signals and may determine that a determination signal of a level exceeding the threshold is "large" and a determination signal of a level below the threshold is "small".

Figure 21A:
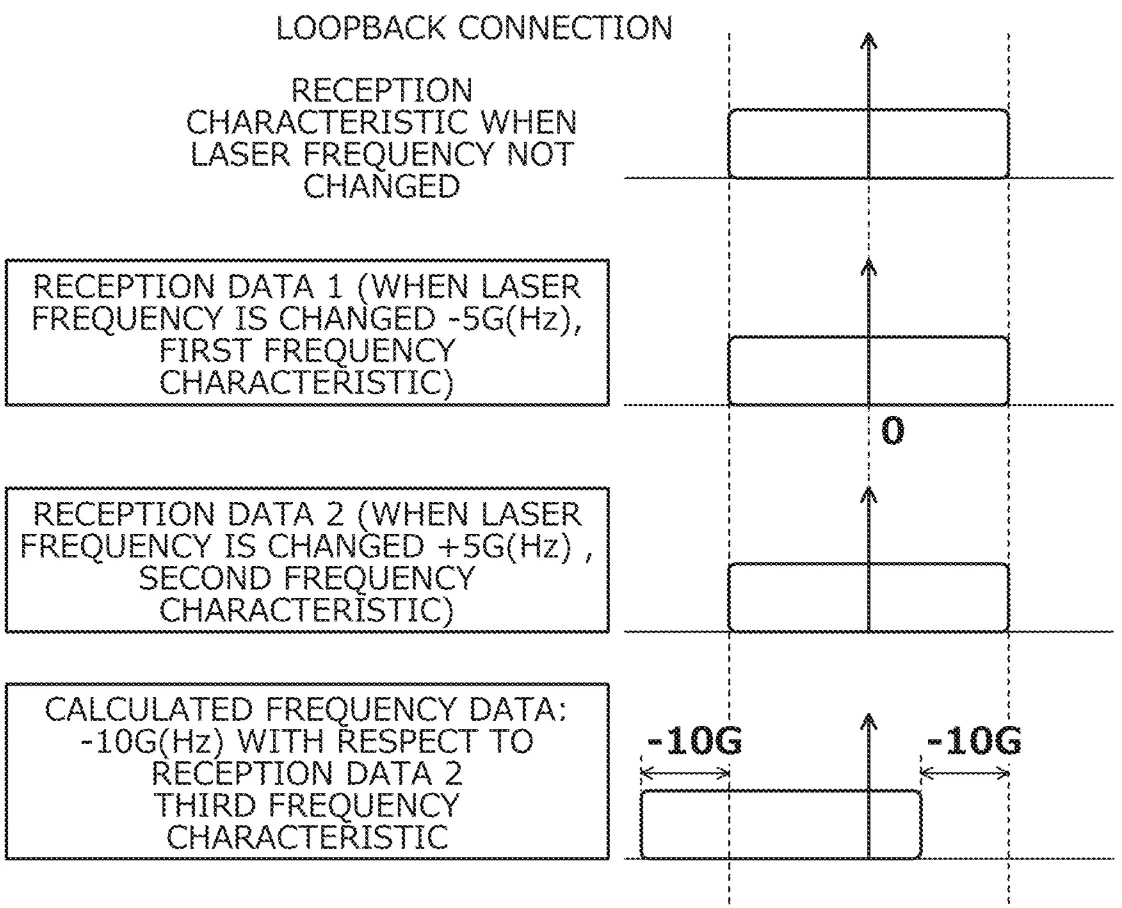
FIG. 21A is a diagram depicting a modification example of the second embodiment.
Figure 21B:
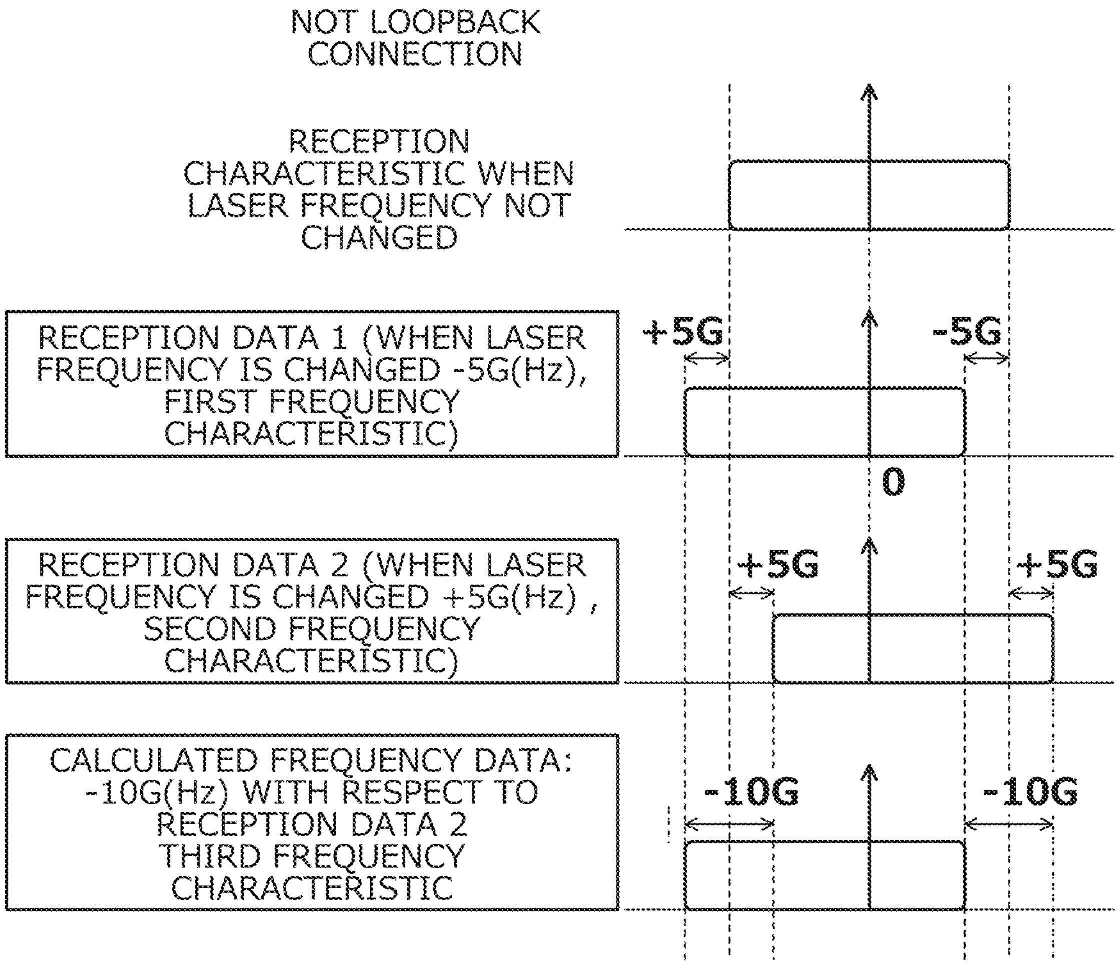
FIG. 21B is a diagram depicting the modification example of the second embodiment.

FIGS. 21A and 21B are diagrams depicting a modification example of the second embodiment. In the modification example described herein, the frequency difference of the reception signals is set larger than the frequency differ in the second embodiment. In FIGS. 21A and 21B, correspondence between changes in laser frequency on the receiving-side and the presence/absence of a loopback connection is depicted, and offsets are set for the first and second frequency characteristics, respectively. In the example depicted in FIGS. 21A and 21B, the center frequency of the data of the first frequency characteristic is assumed to be −5 GHz in a first direction while the center frequency of the data of the second frequency characteristic is assumed to be +5 GHz in a second direction that is opposite to the first direction.

FIG. 21A depicts the amount of change in the frequency in an instance of a loopback connection. A horizontal axis indicates frequency. In an instance of a loopback connection, the center frequency of the reception data does not change in reception characteristics indicated at the uppermost tier of an instance when the frequency of the LD 1512 is not changed, the center frequency does not change in reception characteristics of an instance when the frequency of the LD 1512 is changed −5 GHz, and the center frequency does not change in reception characteristics in an instance when the frequency of the LD 1512 is changed +5 GHz. Here, the frequency change calculating unit 1602 calculates −10 GHz for the data of the second frequency characteristic. The 10 GHz corresponds to the sum of absolute values of a change of −5 GHz in the first direction in the center frequency of the data of the first frequency characteristic and a change of +5 GHz in the second direction of the center frequency of the data of the second frequency characteristic. In this instance, the signal bandwidth of the data of the third frequency characteristic indicated at a lowermost tier is shifted by −10 GHz.

FIG. 21B depicts the amount of change in the frequency in an instance of no loopback connection. In an instance of no loopback connection, the signal bandwidth of reception characteristics in an instance when the frequency of the LD 1512 is changed −5 GHz with respect to the reception characteristics indicated in an uppermost tier of an instance when the frequency of the LD 1512 is not changed is −5 GHz. Further, the signal bandwidth of reception characteristics shifts +5 GHz in an instance when the frequency of the LD 1512 is changed +5 GHz. In an instance in which the frequency change calculating unit 1602 calculates −10 GHz with respect to the data of the second frequency characteristic, the signal bandwidth of the data of the third frequency characteristic shifts −10 GHz with respect to the data of the first frequency characteristic and the data of the second frequency characteristic.

FIG. 22 is a block diagram depicting the functions of the receiving-side controller in the modification example of the second embodiment. Functions of components of the receiving-side controller 1514 depicted in FIG. 22 are the same as the functions depicted in FIG. 16 and are assigned the same reference numerals used in FIG. 16. While aspects different from FIG. 16 are indicated in bold lettering, differences include the reception data 1 being reception data of an instance when the frequency of the LD 1512 of the optical receiver 1500*b* is changed −5 GHz and the frequency change calculating unit 1602 calculating −10 GHz for the reception data 2.

Figure 23:
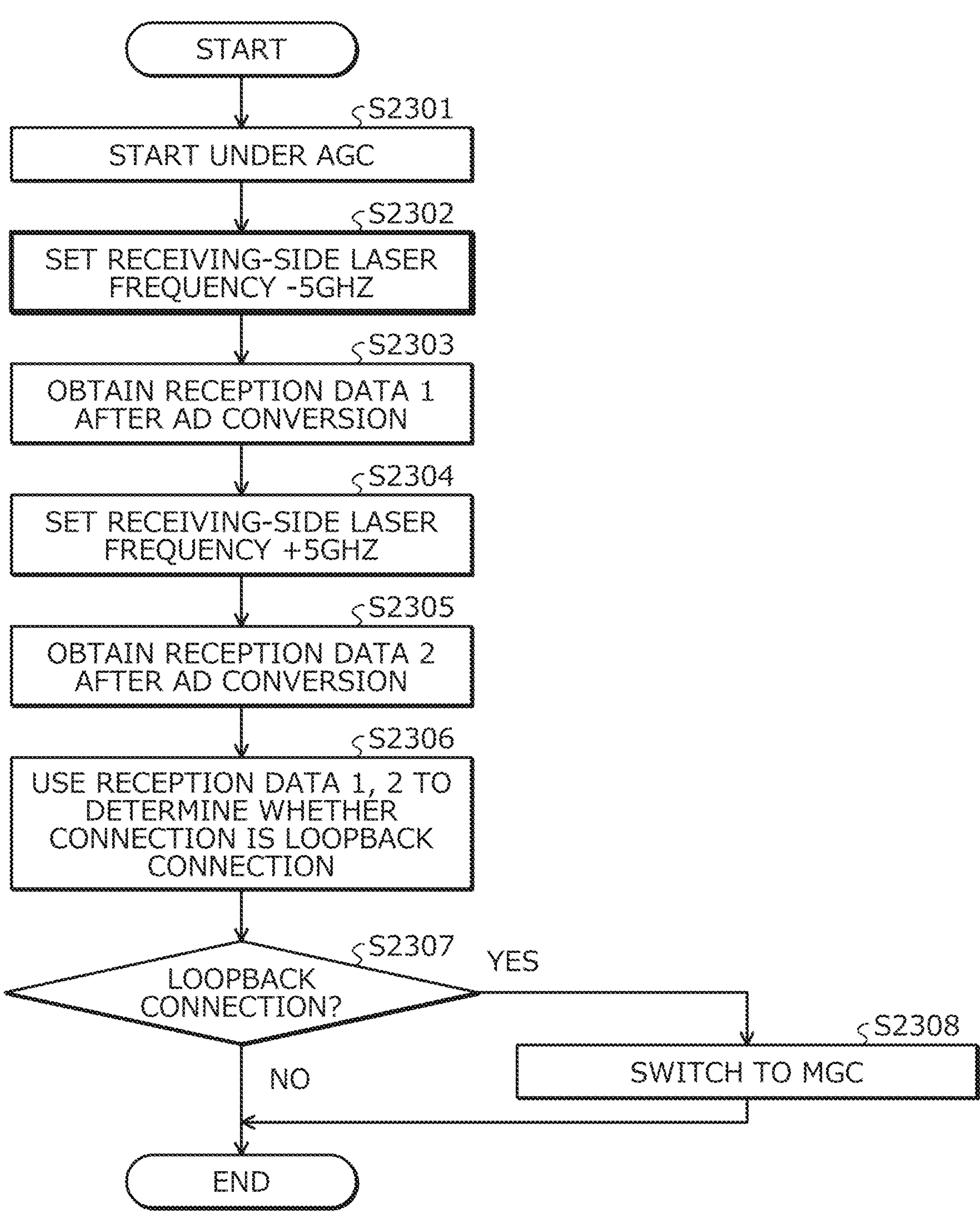
FIG. 23 is a flowchart depicting an example of processes of determining loopback connection in the modification example of the second embodiment.

FIG. 23 is a flowchart depicting an example of processes of determining loopback connection in the modification example of the second embodiment. The processes depicted in FIG. 23 are executed by the receiving-side controller 1514 depicted in FIG. 2. In the processes depicted in FIG. 23, an aspect different from the processes depicted in FIG. 18 is an additional process at step S2302.

First, the receiving-side controller 1514, in an initial state, starts control of reception gain by the AGC (step S2301). Next, the receiving-side controller 1514 performs settings to change the laser frequency of the LD 1512 by a first offset (−5 GHZ) (step S2302).

Subsequently, the receiving-side controller 1514 obtains the reception data 1 after AD conversion by the ADC 304 (step S2303). The reception data 1 is reception data of an instance when the frequency of the LD 1512 is changed-5 GHz; the reception data 1 is obtained from the RAM 1513.

Next, the receiving-side controller 1514 performs settings to change the laser frequency of the LD 1512 by a second offset (+5 GHZ) (step S2304).

Next, the receiving-side controller 1514 obtains the reception data 2 after AD conversion by the ADC 304 (step S2305). The reception data 2 is reception data of an instance when the frequency of the LD 1512 is changed +5 GHz; the reception data 2 is obtained from the RAM 1513.

Next, the receiving-side controller 1514 uses the obtained reception data 1, 2 to determine whether the connection is a loopback connection (step S2306) and determines whether the connection is a loopback connection (step S2307). When the determination result is that the connection is a loopback connection (step S2307: YES), the receiving-side controller 1514 switches the gain control from the AGC control to a fixed gain control (MGC) (step S2308), and terminates the processes above. On the other hand, when the determination result is that the connection is not a loopback connection (step S2307: NO), the receiving-side controller 1514 does not change the gain control and terminates the processes, leaving the gain control under the AGC control.

As with the modification example of the second embodiment described above, the greater is the frequency difference of the reception signals, the greater the sensitivity of detection of a loopback connection may be enhanced. Further, in the description above, when the frequency difference is assumed to be 10 GHz, the laser frequency of the LD 1512 is changed +5 GHz, and the frequency may be changed within an adjustment range of the LD 1512.

According to the embodiments described above, in a control method of an optical transceiver that includes a light source for transmission and reception of optical signals, it is determined whether the connection state of a transmission path for a reception port is a loopback connection from a transmission port of the optical transceiver thereof and in an instance of a loopback connection, control of the reception gain is switched from an AGC to a fixed gain. As a result, gain control corresponding to the port connection state including a loopback connection state is performed.

Further, the connection determination of whether the connection is a loopback connection may be based on a change of the frequency offset amount between the locally generated light and an optical signal with respect to the change in frequency of the light source. Further, the connection may be determined to be a loopback connection in an instance when the frequency of the light source is changed a predetermined amount and the predetermined amount of change in the frequency of an optical signal is detected on the receiving-side. As a result, the presence or absence of a loopback connection in an optical transceiver having a single light source for the transmission and the reception of optical signals may be determined by a simple process.

Further, in the connection determination, the process of changing the frequency of the light source a predetermined amount and detecting the frequency of the optical signal at the receiving-side may be performed multiple times. In this instance, when for all the times that the process is performed, the frequency offset amount between the locally generated light and the optical signal detected on the receiving-side is within a predetermined threshold range, the connection is determined to be a loopback connection. As a result, accuracy of the determination of a loopback connection is enhanced.

Further, in the connection determination, the connection state of the transmission path may be determined to be a peer-to-peer connection in an instance when the frequency of the light source is changed and the frequency offset amount between the locally generated light and the optical signal detected at the receiving-side is outside a predetermined threshold range, as depicted in FIG. 11C. As a result, whether the connection state in the optical transceiver is a loopback connection or a peer-to-peer connection may be determined automatically and gain control corresponding to the determination result may be executed.

Further, the connection may be determined to be a loopback connection in an instance in which the ID unique to the optical transceiver 100 is inserted into an available region of an optical signal transmitted from the transmission port of the optical transceiver 100 and via the reception port of the optical transceiver 100, an optical signal having the ID of the optical transceiver 100 is received. By the use of such an ID, the presence or absence of a loopback connection in an optical transceiver having a single light source for the transmission and the reception of optical signals may be performed by a simple process.

Further, after switching, whether an error has occurred with reception data processed for reception is determined and when an error occurs, processes for determining the connection may be executed again. As a result, accuracy of the determination of a loopback connection may be enhanced.

Further, the light source may be a single light source for transmission and reception of optical signals. As a result, the number of light sources in the device decreases and cost may be reduced. Further, in an operation verification test at the time of product shipment, the operator may perform the test as usual without any special operations and without regard for whether the optical transceiver includes a single light source for transmission and reception.

Further, the light source may include different light sources on the transmitting-side and the receiving-side of optical signals. In this instance, the connection determination may determine whether the connection is a loopback connection based on the first reception data of an instance when the frequency of the light source on the receiving-side is not changed and the second reception data in an instance when the frequency of the light source on the receiving-side is changed a predetermined amount. As a result, merely changing the frequency of local light at the receiving-side device make it possible to determine whether the connection is a loopback connection by using the reception data from before and after the change. Furthermore, whether the connection is a loopback connection may be determined even when no signal is being communicated to the DSP of the receiving-side device.

Further, the connection determination may determine whether the connection is a loopback connection, according to a combination of whether the signal bandwidth of the second reception data matches the signal bandwidth of the first reception data and whether the signal bandwidth of the third data matches the signal bandwidth of the first reception data, based on the first reception data of a state when the frequency of the light source on the receiving-side is not changed, the second reception data of a state when the frequency of the light source on the receiving-side is changed a predetermined amount, and the third data obtained by calculating and restoring the amount changed in the second reception data. As described, whether the connection is a loopback connection may be determined simply, based on whether the signal bandwidth of the reception data after the frequency of the light source on the receiving-side is changed matches the signal bandwidth of the reception data before the frequency is changed.

Further, the connection determination may determine whether the connection is a loopback connection, according to a combination of whether the signal bandwidth of the second reception data matches the signal bandwidth of the first reception data and whether the signal bandwidth of the third data matches the signal bandwidth of the first reception data, based on the first reception data of a state when the frequency of the light source on the receiving-side is changed a predetermined amount in the first direction, the second reception data of a state when the frequency of the light source on the receiving-side is changed by the predetermined amount in the second direction different from the first direction, and the third data obtained by restoring the absolute value of the sum of the amounts of change to the second reception data, respectively, in the first direction and in the second direction. In this instance, the amount of change of the frequency of the light source on the receiving-side may be increased and the accuracy of the determination of whether the connection is a loopback connection may be enhanced.

According to an embodiment of the present invention, an effect is achieved in that gain control is performed corresponding to the state of port connection including a loopback connection.

All examples and conditional language provided herein are intended for pedagogical purposes of aiding the reader in understanding the invention and the concepts contributed by the inventor to further the art and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A control method of an optical transceiver having a transmission port, a reception port, and a light source for transmission and reception of an optical signal, the control method comprising:
   - determining whether a state of a connection of a transmission path to the reception port is a loopback connection from the transmission port; and
   - switching a control of a gain of the reception from an automatic gain control (AGC) to a fixed gain when determining the state of the connection to be the loopback connection.

2. The control method according to claim 1, wherein the determining includes determining whether the state of the connection is the loopback connection, based on a change of a frequency offset amount between a locally generated light and the optical signal with respect to a change of a frequency of the light source.

3. The control method according to claim 1, wherein the determining includes determining the state of the connection to be the loopback connection, when a frequency of the light source is changed by a predetermined amount and a change of the predetermined amount is detected in a frequency of the optical signal at a receiving-side.

4. The control method according to claim 3, wherein the determining includes:
   - executing, a plurality of times, a process of changing the frequency of the light source by the predetermined amount and detecting the frequency of the optical signal at the receiving-side, and
   - determining the state of the connection to be the loopback connection, when a frequency offset amount between the locally generated light and the optical signal detected at the receiving-side is within a predetermined threshold range for all the plurality of times the process is performed.

5. The control method according to claim 3, wherein the determining includes determining the state of the connection of the transmission path to be a peer-to-peer connection, when a frequency offset amount between the locally generated light and the optical signal detected at the receiving-side is outside a predetermined threshold range when the frequency of the light source is changed by the predetermined amount.

6. The control method according to claim 1, wherein the determining includes:

inserting an identification (ID) unique to the optical transceiver into an available region of the optical signal to be transmitted from the transmission port, and determining the state of the connection to be the loopback connection, when an inclusion of the ID of the optical transceiver in the optical signal received via the reception port is detected.

7. The control method according to claim 1, further comprising after the switching:

determining whether an error has occurred in reception data processed for reception; and re-executing the determining the state of the connection, when determining that the error has occurred.

8. The control method according to claim 1, further comprising outputting, to an external device, a result of the determining the state of the connection.

9. The control method according to claim 1, wherein the light source is a single light source for the transmission and the reception.

10. The control method according to claim 1, wherein the light source includes a first light source for the transmission and a second light source for the reception, and the determining includes determining whether the state of the connection is the loopback connection, based on a first reception data of an instance when a frequency of the second light source is not changed and a second reception data of an instance when the frequency of the second light source is changed by a predetermined amount.

11. The control method according to claim 10, wherein the determining includes determining whether the state of the connection is the loopback connection, according to a combination of whether a signal bandwidth of the second reception data matches a signal bandwidth of the first reception data and whether a signal bandwidth of a third data matches the signal bandwidth of the first reception data, based on the first reception data, the second reception data, and the third data obtained by calculating and restoring the predetermined amount changed in the second reception data.

12. The control method according to claim 1, wherein the light source includes a first light source for the transmission and a second light source for the reception, and the determining includes determining whether the state of the connection is the loopback connection, according to a combination of whether a signal bandwidth of a second reception data matches a signal bandwidth of a first reception data and whether a signal bandwidth of a third data matches the signal bandwidth of the first reception data, based on the first reception data of an instance when a frequency of the second light source is changed a predetermined amount in a first direction, the second reception data of an instance when the frequency of the second light source is changed the predetermined amount in a second direction different from the first direction, and the third data obtained by calculating and restoring an absolute value of a sum of the predetermined amount changed in the first direction and the predetermined amount changed in the second direction in the second reception data.

13. An optical transceiver having a transmission port, a reception port, and a light source for transmission and reception of an optical signal, the optical transceiver comprising a processor configured to:

determine whether a state of a connection of a transmission path to the reception port is a loopback connection from the transmission port; and switch a control of a gain of the reception from an automatic gain control (AGC) to a fixed gain when determining the state of the connection to be the loopback connection.

* * * * *